United States Patent
Kim et al.

(10) Patent No.: US 10,222,644 B2
(45) Date of Patent: *Mar. 5, 2019

(54) LIQUID CRYSAL DISPLAY INCLUDING NANOCAPSULE LAYER

(71) Applicant: LG Display Co., Ltd., Seoul (KR)

(72) Inventors: Kyeong-Jin Kim, Paju-si (KR); Jung-Im Hwang, Paju-si (KR); Ji-Na Jeon, Paju-si (KR); Kyung-Su Ha, Paju-si (KR); Min-Geun Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,651

(22) Filed: Jul. 10, 2017

(65) Prior Publication Data

US 2017/0307917 A1 Oct. 26, 2017

Related U.S. Application Data

(60) Continuation of application No. 15/359,839, filed on Nov. 23, 2016, now Pat. No. 9,759,943, which is a
(Continued)

(30) Foreign Application Priority Data

Oct. 23, 2013 (KR) .................. 10-2013-0126534
Dec. 6, 2013 (KR) .................. 10-2013-0151308
Dec. 10, 2013 (KR) .................. 10-2013-0152890

(51) Int. Cl.
*G02F 1/1334* (2006.01)
*G02F 1/1333* (2006.01)
(Continued)

(52) U.S. Cl.
CPC .......... *G02F 1/1334* (2013.01); *G02F 1/1368* (2013.01); *G02F 1/13338* (2013.01);
(Continued)

(58) Field of Classification Search
CPC ............. G02F 1/133608; G02F 1/1336; G02F 2001/133314
See application file for complete search history.

(56) References Cited

U.S. PATENT DOCUMENTS 7,440,073 B2 * 10/2008 Sawasaki .......... G02F 1/133514
349/106
2009/0207359 A1 * 8/2009 Shin .................. G02F 1/133707
349/129
2012/0113363 A1 * 5/2012 Lim ...................... G02F 1/1334
349/96

FOREIGN PATENT DOCUMENTS

CN 101510032 A 8/2009
JP 2003-177387 A 6/2003
(Continued)

OTHER PUBLICATIONS

Chinese Office action,translated, dated Jan. 18, 2017, from U.S. Appl. No. 15/359,839.*

*Primary Examiner* — Tracie Y Green
(74) *Attorney, Agent, or Firm* — Dentons US LLP

(57) ABSTRACT

Disclosed is a liquid crystal display device that may include a first substrate; a first electrode on the first substrate, the first electrode including a plurality of first inclined planes; a nanocapsule liquid crystal layer on the first electrode, the nanocapsule liquid crystal layer including a plurality of nano-sized capsules dispersed in a buffer layer, each of the plurality of nano-sized capsules including nematic liquid crystal molecules having a negative dielectric constant anisotropy; and a second electrode on the nanocapsule liquid crystal layer, the second electrode including a plurality of
(Continued)

second inclined planes facing the plurality of first inclined planes, wherein the nanocapsule liquid crystal layer is substantially, optically isotropic in a normal state, and is optically anisotropic when a voltage is applied to the first and second electrodes.

11 Claims, 20 Drawing Sheets

Related U.S. Application Data division of application No. 14/518,327, filed on Oct. 20, 2014, now Pat. No. 9,535,279.

(51) Int. Cl.
| | | |
|---|---|---|
| G02F 1/1335 | (2006.01) | |
| G02F 1/1368 | (2006.01) | |
| G02F 1/1343 | (2006.01) | |
| G02F 1/1337 | (2006.01) | |
| G02F 1/137 | (2006.01) | |
| G02F 1/13363 | (2006.01) | |
| F21V 8/00 | (2006.01) | |

(52) U.S. Cl.
CPC ...... *G02F 1/13363* (2013.01); *G02F 1/13718* (2013.01); *G02F 1/133305* (2013.01); *G02F 1/133514* (2013.01); *G02F 1/133524* (2013.01); *G02F 1/133528* (2013.01); *G02F 1/133553* (2013.01); *G02F 1/133603* (2013.01); *G02F 1/133707* (2013.01); *G02F 1/134309* (2013.01); *G02B 6/0056* (2013.01); *G02F 2001/13712* (2013.01); *G02F 2001/133531* (2013.01); *G02F 2001/133541* (2013.01); *G02F 2001/133638* (2013.01); *G02F 2202/36* (2013.01); *G02F 2203/02* (2013.01)

(56) References Cited

FOREIGN PATENT DOCUMENTS

| JP | 2003-344660 A | 12/2003 |
| JP | 2006-053419 A | 2/2006 |
| JP | 2009-193066 A | 8/2009 |
| JP | 2012-103685 A | 5/2012 |
| KR | 1020110095634 A | 8/2011 |

* cited by examiner backlight unit(60)

backlight unit(60)

backlight unit(160)

LIQUID CRYSAL DISPLAY INCLUDING NANOCAPSULE LAYER

This application is a Continuation of U.S. patent application Ser. No. 15/359,839, filed on Nov. 23, 2016, now allowed, which is a Divisional of U.S. patent application Ser. No. 14/518,327, filed on Oct. 20, 2014, now U.S. Pat. No. 9,535,279, and claims the benefit of Korean Patent Application Nos. 10-2013-0126534, 10-2013-0151308 and 10-2013-0152890, filed on Oct. 23, 2013, Dec. 6, 2013 and Dec. 10, 2013, respectively, which are hereby incorporated by reference for all purposes as if fully set forth herein.

BACKGROUND OF THE INVENTION

Field of the Invention

The present invention relates to a liquid crystal display device (LCD), and more particularly, to an LCD including a nanocapsule layer and method for manufacturing the same.

Discussion of the Prior Art

Recently, facing information society, display field of displaying electric information signals has been rapidly advanced, and flat display devices having high performances of thin profile, lightweight and low power consumption have been developed and used. Among these flat display devices, liquid crystal display devices (LCDs) are widely used.

FIG. 1 is a cross-sectional view illustrating an LCD according to the prior art.

Referring to FIG. 1, the LCD includes a liquid crystal panel 10 including an array substrate, a color filter substrate and a liquid crystal layer 50 between the array substrate and the color filter substrate, and a backlight unit 60 below the liquid crystal panel 10. A first substrate 2 referred to as the array substrate includes a pixel region P, and on an inner surface of the first substrate 2, a thin film transistor T is in each pixel region P and connected to a pixel electrode P in each pixel region P.

On an inner surface of a second substrate 4 referred to as the color filter substrate, a black matrix 32 is formed in a lattice shape surrounding the pixel region P to cover a non-display element such as the thin film transistor T and expose the pixel electrode 28.

Red, green and blue color filters 34 are formed in the lattice shape corresponding to the respective pixel regions P, and a common electrode 36 is formed on the black matrix 32 and the color filters 34.

First and second polarizing plates 20 and 30 are attached onto outer surfaces of the first and second substrates 2 and 4, respectively.

First and second alignment layers 31a and 31b are formed between both the pixel electrode 28 and the common electrode 36, and the liquid crystal layer 50. The first and second alignment layers 31a and 31b are rubbed and align liquid crystal molecules.

A seal pattern 70 is formed between and along peripheral regions of the first and second substrates 2 and 4 and prevents leakage of the liquid crystal.

The backlight unit 60 supplies light to the liquid crystal panel 10. The backlight unit 60 is categorized into a sidelight type and a direct type.

The sidelight type backlight unit has a light source on at least one side of a light guide panel. The direct type backlight unit has a light source below the liquid crystal panel 10.

The sidelight type backlight unit has advantages of simple manufacturing, thin profile, lightweight, and low power consumption.

FIG. 2 is a cross-sectional view illustrating the LCD including the backlight unit according to the prior art.

Referring to FIG. 2, the backlight unit 60 includes a light guide plate 23, a light emitting diode (LED) assembly 29 along a side of the light guide plate 23, a reflector 25 below the light guide plate 23, and at least one optical sheets 21 on the light guide plate 23.

The LED assembly 29 includes a plurality of LEDs 29a, and a printed circuit board (PCB) 29b on which the LEDs 29a are mounted.

Light emitted from the LED assembly 29 enters into the light guide plate 23, then is refracted toward the liquid crystal panel 10, then is processed into light of high quality and uniform brightness passing through the optical sheet 21, and then enters into the liquid crystal panel 10. Accordingly, the liquid crystal panel 10 displays images.

A portion of the light emitted from the backlight unit 60 is absorbed and reflected by the first polarizing plate 20 and thus is lost, which may be about 50% of all the light emitted from the backlight unit 60. Further, light is absorbed and reflected while passing through the first and second substrates 2 and 4 and the liquid crystal layer (50 of FIG. 1), and thus an additional portion of the light is lost. As such, the LCD has disadvantage in brightness compared with other types of flat display displays.

Moreover, the LCD has slow response speed, and thus display quality is reduced due to afterimage.

Moreover, the LCD requires many production processes, and thus production efficiency is reduced.

The above LCD using the backlight unit 60 is referred to as a transmissive type LCD, in which the backlight unit 60 consumes about two-third or more of a total power of the LCD. To solve this problem, a reflective type LCD not using a backlight unit is suggested.

However, in the reflective type LCD, light leakage is easily caused by an external force, and thus display quality is reduced. Moreover, the reflective type LCD also requires many production processes, and thus production efficiency is reduced.

SUMMARY OF THE INVENTION

Accordingly, the present invention is directed to a liquid crystal display device (LCD) including a nanocapsule layer and method for manufacturing the same that substantially obviates one or more of the problems due to limitations and disadvantages of the prior art.

An advantage of the present invention is to provide an LCD including a nanocapsule layer that can improve its response speed and/or production efficiency.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device may include a first substrate; a first electrode on the first substrate, the first electrode including a plurality of first inclined planes; a nanocapsule liquid crystal layer on the first electrode, the nanocapsule liquid crystal layer including a plurality of nano-sized capsules dispersed in a buffer layer, each of the plurality of nano-sized capsules including nematic liquid crystal molecules having a negative dielectric constant anisotropy; and a second electrode on the nanocapsule liquid crystal layer, the second electrode including a plurality of second inclined planes facing the plurality of first inclined planes, wherein the nanocapsule liquid crystal layer is substantially, optically isotropic in a normal state, and is optically anisotropic when a voltage is applied to the first and second electrodes.

In another aspect, a liquid crystal display device may include a first substrate; a first polarizing plate on an outer surface of the first substrate; a first electrode on an inner surface of the first substrate; a nanocapsule liquid crystal layer that is on the first electrode and includes nano-sized capsules which are each filled with nematic liquid crystal molecules of negative dielectric constant anisotropy and are dispersed in a buffer layer; and a second electrode on the nanocapsule liquid crystal layer; a phase retardation film that is on the second electrode and has a phase retardation value of $\lambda/4$; and a second polarizing plate on the phase retardation film, wherein the nanocapsule liquid crystal layer has an optical anisotropy according to a voltage difference between voltages applied to the first and second electrodes, and has an optical isotropy when no voltages are applied to the first and second electrodes.

In another aspect, a liquid crystal display device may include a first substrate; a plurality of first electrodes on an inner surface of the first substrate; a nanocapsule liquid crystal layer that is on the plurality of first electrodes and includes nano-sized capsules which are each filled with nematic liquid crystal molecules of negative dielectric constant anisotropy and are dispersed in a buffer layer; and a second electrode on the nanocapsule liquid crystal layer, wherein the nanocapsule liquid crystal layer has an optical anisotropy according to a voltage difference between voltages applied to the first and second electrodes, and has an optical isotropy when no voltages are applied to the first and second electrodes.

In another aspect, a reflective type liquid crystal display device may include a liquid crystal panel that includes a first electrode, a second electrode, and a nanocapsule liquid crystal layer between the first and second electrodes; a polarizing plate that is on a surface of the liquid crystal layer through which an external light enters; a phase retardation plate between the polarizing plate and the liquid crystal panel; and a reflection plate that reflects light passing through the nanocapsule liquid crystal layer, wherein the nanocapsule liquid crystal layer has an optical anisotropy according to a voltage difference between voltages applied to the first and second electrodes, and has an optical isotropy when no voltages are applied to the first and second electrodes.

In another aspect, a flexible type liquid crystal display device may include a liquid crystal panel that includes a nanocapsule liquid crystal layer on a substrate which a first electrode and a second electrode are formed on; a polarizing plate on the liquid crystal panel; and a backlight unit that is below the liquid crystal panel, and supplies a predetermined linearly polarized light perpendicular to a polarizing axis of the polarizing plate, wherein the nanocapsule liquid crystal layer has an optical anisotropy according to a voltage difference between voltages applied to the first and second electrodes, and has an optical isotropy when no voltages are applied to the first and second electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings. The same reference numbers may be used throughout the drawings to refer to the same or like parts.

Figure 3:
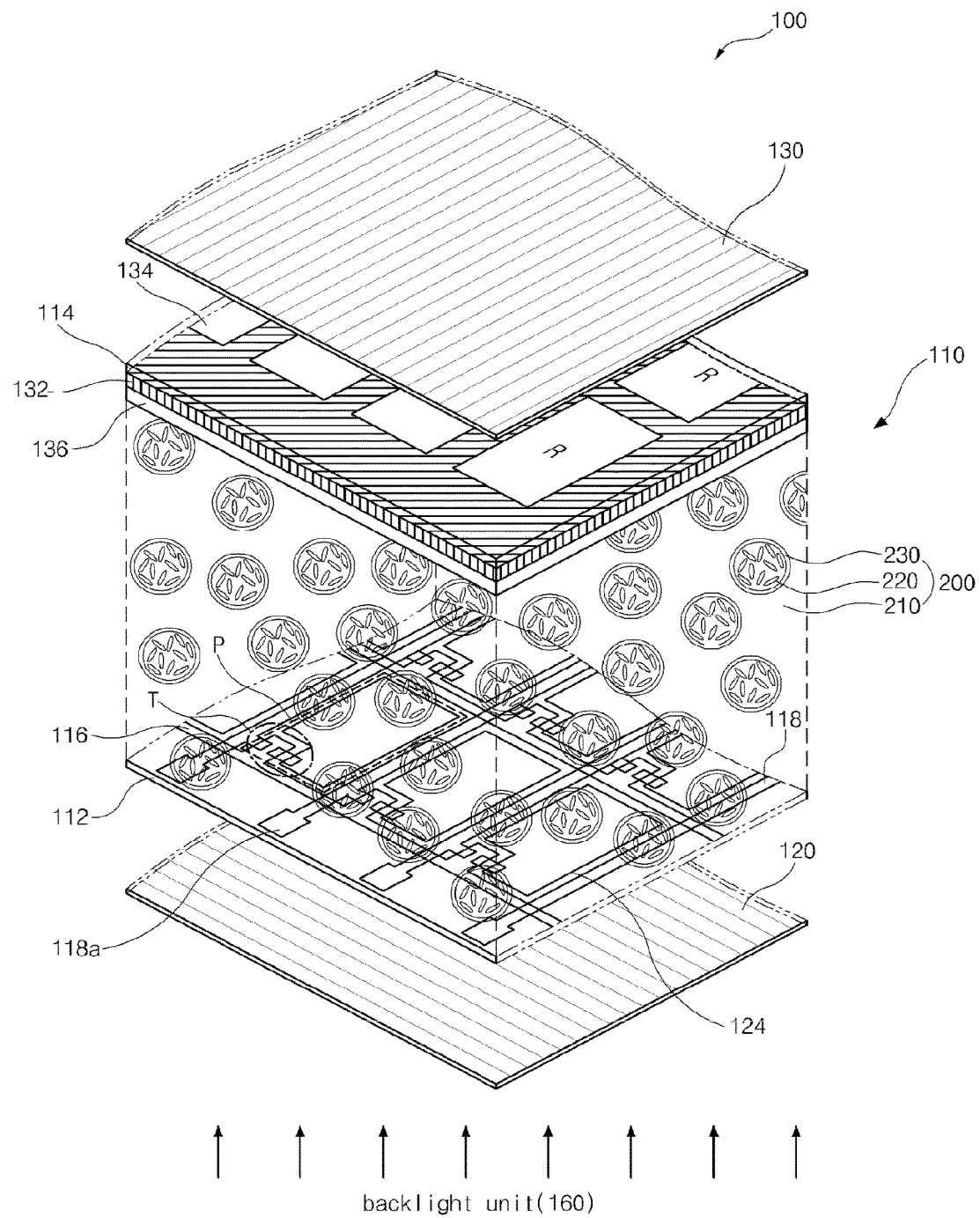
FIG. 3 is a schematic perspective view illustrating an LCD according to the present invention.

FIG. 3 is a schematic perspective view illustrating an LCD according to an embodiment of the present invention.

Referring to FIG. 3, the LCD 100 includes a liquid crystal panel 110 that includes a first substrate 112, a second substrate 114, and a nanocapsule liquid crystal layer 200 between the first and second substrates 112 and 114.

The first substrate 112 is referred to as a lower substrate or an array substrate. A plurality of gate lines 116 and a plurality of data lines 118 cross each other on an inner surface of the first substrate 112 to define a plurality of pixel regions P.

A thin film transistor T is formed near the crossing portion of the gate and data lines 116 and 118, and is connected to a pixel electrode 124 in the pixel region P.

The second substrate 114 is referred to as an upper substrate or a color filter substrate. A black matrix 132 is on an inner surface of the second substrate 114, and shields a non-display element such as the gate line 116, the data line 118, and the thin film transistor T exposing the pixel electrode 124. The black matrix 132 has a lattice shape surrounding the pixel region P.

Red, green and blue color filters 134 fill openings of the black matrix 132 corresponding to the respective pixel regions P. A common electrode 136 covers the black matrix 132 and the color filters 134.

Even though not shown in the drawings, the first substrate 112 has an area greater than that of the second substrate 114 so that a peripheral portion of the first substrate 112 is exposed outside the second substrate 114. In the exposed portion of the first substrate 112, data pads 118a connected to the respective data lines 118, and gate pads (not shown) connected to the respective gate lines 116 are formed.

When a gate line 116 is selected and supplied with a turn-on gate signal i.e., high-level gate signal, the thin film transistor T connected to the selected gate line 116 is turned on and an image data signal is transferred to the pixel electrode 124 through the data line 118. Accordingly, an electric field is induced between the pixel electrode 124 and the common electrode 136 and controls liquid crystal molecules 220 of the nanocapsule liquid crystal layer 200, and thus light transmittance is changed to display images.

A first polarizing plate 120 and a second polarizing plate 130 are attached onto outer surfaces of the liquid crystal panel 110. In other words, the first polarizing plate 120 is on an outer surface of the first substrate 112, and the second polarizing plate 130 is on an outer surface of the second substrate 114. The first polarizing plate 120 has a first polarizing axis along a first direction while the second polarizing plate 130 has a second polarizing axis along a second direction perpendicular to the first direction.

A backlight unit 160 is located below the liquid crystal panel 110 to supply light to the liquid crystal panel 110.

A sidelight type or direct type backlight unit may be used as the backlight unit 160.

A cold cathode fluorescent lamp (CCFL), an external electrode fluorescent lamp (EEFL), or a light emitting diode (LED) may be used as a light source of the backlight unit 160.

The nanocapsule liquid crystal layer 200 includes a plurality of nanocapsules 230 and a buffer layer 210. The nanocapsules 230 are dispersed in the buffer layer 210, with each including a plurality of liquid crystal molecules 220 therein. The nanocapsule liquid crystal layer 200 changes light transmittance to display images.

The nanocapsule liquid crystal layer 200 is an optically isotropic type liquid crystal layer in a normal state. Accordingly, when no electric field is applied to the nanocapsule liquid crystal layer 200 between the pixel electrode 124 and the common electrode 136, the nanocapsule liquid crystal layer 200 is optically isotropic. However, when an electric field is applied, the nanocapsule liquid crystal layer 200 has a birefringence property in a direction perpendicular to the applied electric field.

Accordingly, when an electric field is applied, the nanocapsule liquid crystal layer 200 may have an optically uniaxial property, with light transmittance being dependent upon viewing angles.

When an electric field is applied, the liquid crystal molecules 220 are regularly arranged at about 45 degrees with respect to the polarizing axis of each of the first and second polarizing plates 120 and 130.

In more detail, the liquid crystal molecules 220 are capsuled by the nanocapsule 230 having a nanosize, and the liquid crystal molecules 220 are irregularly arranged within the nanocapsule 230.

The nanocapsule 230 may have about 5% to about 95% of a total volume of the nanocapsule liquid crystal layer 200, and preferably, may have about 25% to about 65% of the total volume of the nanocapsule liquid crystal layer 200. The buffer layer 210 occupies the rest of the total volume.

The buffer layer 210 may be made of a transparent or semi-transparent material and have water-solubility, fat-solubility, or mixture of water-solubility and fat-solubility. The buffer layer 210 may be heat cured or UV cured.

The buffer layer 210 may have an additive to increase strength and reduce curing time.

The nanocapsule 230 may have a diameter of about 1 nm to about 320 nm, and preferable, about 30 nm to about 100 nm.

Because the nanocapsule 230 has a diameter less than any wavelengths of visible light, there occurs substantially no optical change due to refractive index, and optically isotropic property can be obtained. Further, scattering of visible light can be minimized.

Particularly, when the nanocapsule 230 is formed with a diameter of about 100 nm or less, high contrast ratio can be obtained.

The irregularly arranged liquid crystal molecules 220 and the nanocapsule 230 have different refractive indices, and thus a light scattering may occur at the interface therebetween. Accordingly, when light passes through the interface, the light is scattered and becomes opaque in milk white.

However, when an electric field is applied to the nanocapsule liquid crystal layer 200, the liquid crystal molecules 220 filling the nanocapsule 230 are regularly arranged.

In this state, the refractive index of the liquid crystal molecules 220 is changed. In order to reduce or minimize a light scattering at the interface between the nanocapsule 230 and the liquid crystal molecules 220, the nanocapsule 230 and the regularly arranged liquid crystal molecules 220 are formed such that they have refractive indices that are substantially close to each other, Therefore, the nanocapsule liquid crystal layer 200 can be seen transparent.

In this case, it is preferred that a difference between the refractive index of the nanocapsule 220 and the refractive index of the liquid crystal molecules 220 is within about ±0.1. The average refractive index (n) of the liquid crystal molecules 220 may be defined as follows: n=[(ne+2*no)/3] (where ne is a refractive index of a major axis of the liquid crystal molecules 220, and no is a refractive index of a minor axis of the liquid crystal molecules 220).

Accordingly, the LCD 100 including the nanocapsule liquid crystal layer 200 can be used as a display device, with its transmittance changing according to a variation of the voltage applied.

Further, when the electric field is induced between the first and second substrates 112 and 114, the liquid crystal molecules 220 are dynamically rotated, and thus response speed can be fast.

Further, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Figure 1:
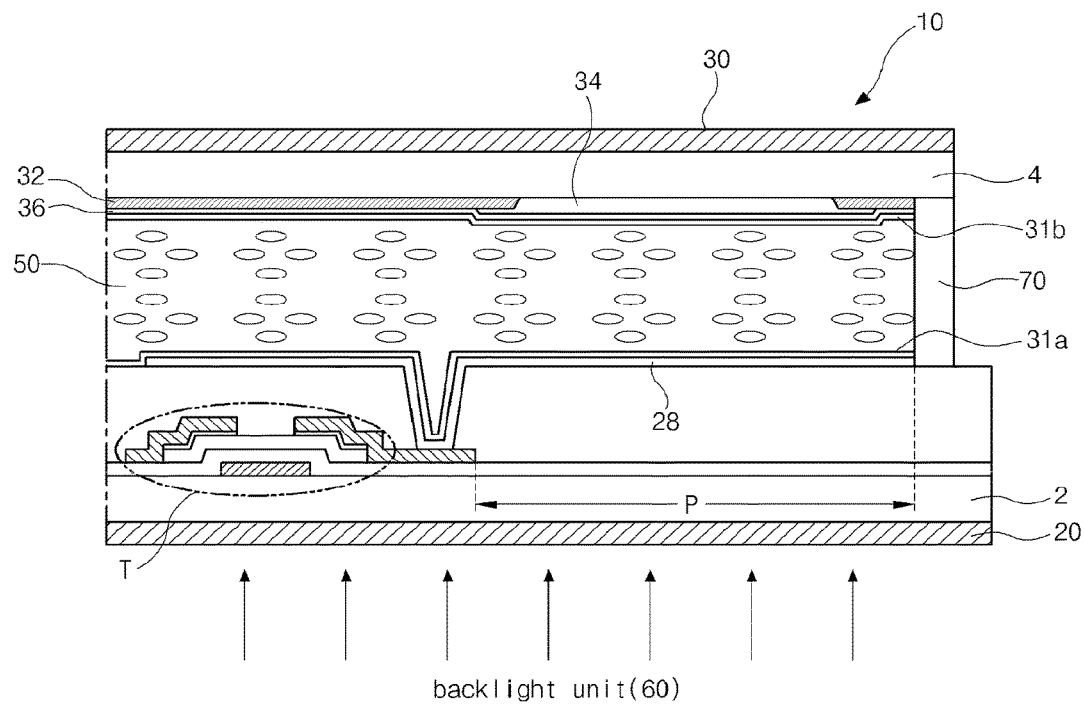
FIG. 1 is a cross-sectional view illustrating an LCD according to the prior art.

Further, in case that the nanocapsules 230 are dispersed in the buffer layer 210 made of, for example, liquid crystal, the nanocapsule liquid crystal layer 200 may be formed, for example, by a printing method, coating method, or dispensing method. In case that the nanocapsules 230 are dispersed in the buffer layer 210 made in a film type, the nanocapsule liquid crystal layer 200 may be formed, for example, by a lamination method. Accordingly, a process of forming a gap between the first and second substrates filled with the liquid crystal layer (50 of FIG. 1) in the prior art can be eliminated, and a process of forming the seal pattern (70 of FIG. 1) in the prior art can be eliminated.

Therefore, production efficiency can be improved.

Further, by eliminating the process of forming the alignment layer, in case that the LCD 100 is applied to a touch display device, curved display device or flexible display device, light leakage, which occurs when a rubbing axis is off a desired direction and thus arrangement of liquid crystal molecules goes awry, can be prevented.

Therefore, the LCD 100 can be applied to a touch display device, curved display device, and flexible display device.

Figure 4A:
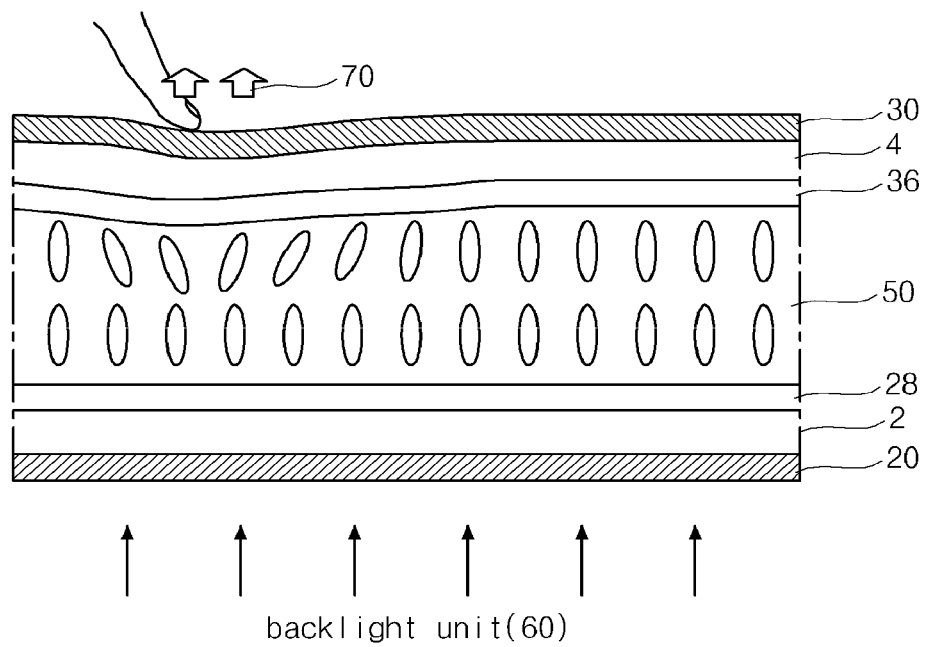
FIGS. 4A and 4B are views illustrating the prior art LCD and an LCD according to an embodiment of the present invention, respectively, to which an external force is applied.
Figure 4B:
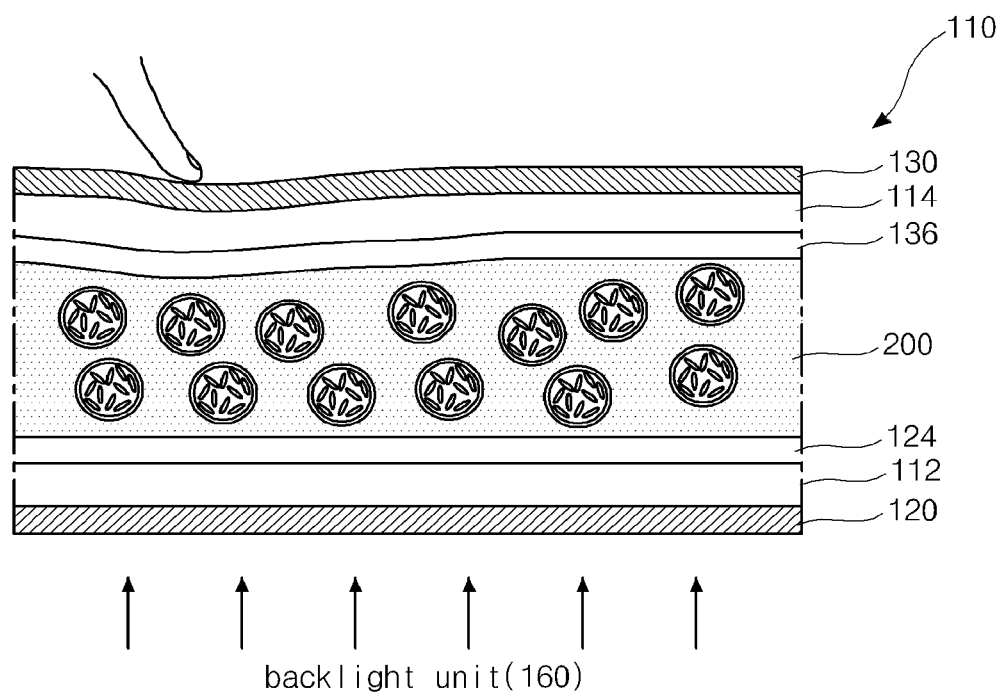

FIGS. 4A and 4B are views illustrating the prior art LCD and an LCD according to an embodiment of the present invention, respectively, to which an external force is applied.

Referring to FIG. 4A, when an external force such as a user's touch is applied to the prior art LCD, arrangement of the liquid crystal molecules of the prior art LCD is influenced by the external force. In other words, arrangement of the liquid crystal molecules are awry due to the external force, thus optic axis is off, and thus light leakage 70 is caused.

However, referring to FIG. 4B, even when an external force such as a user's touch is applied to the LCD 100, the liquid crystal molecules 220 are in the nanocapsule 230 which has the size less than the wavelength of visible light, thus there is no influence of visible light, and thus light leakage due to the external force can be reduced or prevented.

Accordingly, in case that the LCD 100 is applied to a flexible display device, even when an external force is applied to the LCD 100, a light leakage caused by such an external force can be reduced or prevented, because the nanocapsules 230 have a size less than the wavelength of visible light.

It is preferable that the liquid crystal molecules 220 are a negative type liquid crystal molecules with a negative dielectric constant anisotropy, for example, a negative type TN (twisted nematic) liquid crystal molecules.

The negative type liquid crystal molecules 220 are arranged in a direction perpendicular to an electric field induced between the pixel electrode 124 and the common electrode 136.

In other words, the nanocapsule liquid crystal layer 200 uses the nanocapsules 230 having the negative type liquid crystal molecules 220 therein, and when no electric field is applied, the nanocapsule liquid crystal layer 200 has an optical isotropy, and when an electric field is applied, the nanocapsule liquid crystal layer 200 has an optical anisotropy.

Various embodiments of the LCD 100 using the nanocapsule liquid crystal layer 200 are explained as below.

First Embodiment

Figure 5A:
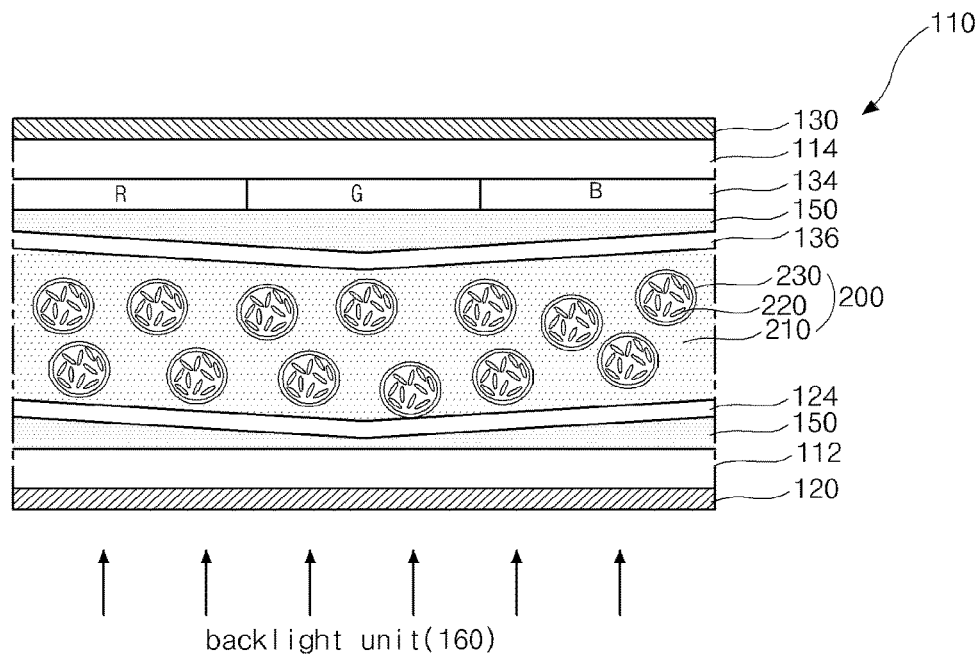
FIGS. 5A and 5B are schematic views illustrating an LCD according to a first embodiment of the present invention.
Figure 5B:
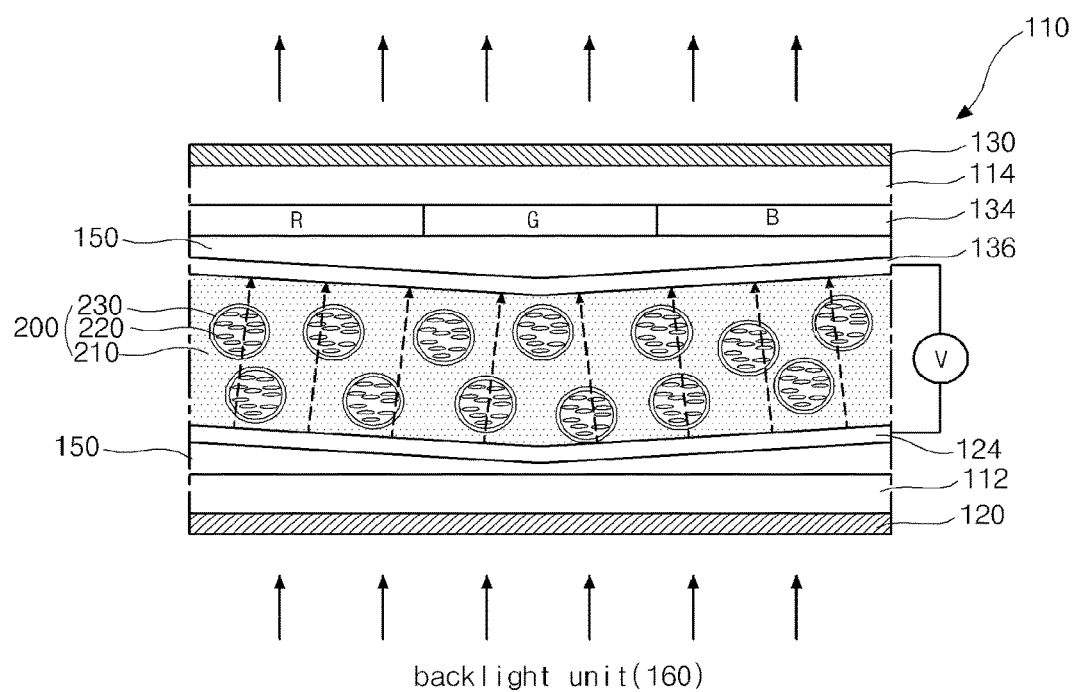

FIGS. 5A and 5B are schematic views illustrating an LCD according to the first embodiment of the present invention.

Referring to FIGS. 5A and 5B, the LCD of the first embodiment includes the liquid crystal panel 110 and the backlight unit 160.

The liquid crystal panel 110 includes the first and second substrates 112 and 114 facing each other, the nanocapsule liquid crystal layer 200, and the first and second polarizing plates 120 and 130 on the outer surfaces of the first and second substrates 112 and 114, respectively.

The liquid crystal panel 110 may be a vertical alignment (VA) mode liquid crystal panel. The thin film transistor (T of FIG. 3) and the pixel electrode 124 are formed on the inner surface of the first substrate 112. The black matrix (132 of FIG. 3), the color filters 134, and the common electrode 136 are formed on the inner surface of the second substrate 114. An overcoat layer may be formed covering the black matrix 132 and the color filters 134.

A plurality of protrusion patterns 150 are arranged in a line form below each of the pixel electrode 124 and the common electrode 136. The protrusion patterns 150 adjoin each other in a band shape extending along a first direction, for example, a length direction of the pixel electrode 124 and the common electrode 136. The protrusion patterns 150 extending along the first direction are repeatedly arranged along a second direction perpendicular to the first direction such that hills and valleys are alternated along the second direction.

The protrusion pattern 150 is made of a transparent insulating material, and has a vertex and first and second inclined planes at both sides of the vertex. The first and second inclined planes are at a cute angle with respect to the plane of the first and second substrates 112 and 114. The inclined plane of the protrusion pattern 150 of the pixel electrode 124 faces and is parallel with the corresponding inclined plane of the protrusion pattern of the common electrode 136.

Because of the protrusion patterns 150 described above, the pixel electrode 124 and the common electrode 136 each have substantially the same configuration of the protrusion patterns 150 therebelow.

In other words, the pixel electrode 124 is formed to have vertices and first and second inclined planes at both sides of each vertex, and the common electrode 136 is formed to have vertices and first and second inclined planes at both sides of each vertex.

The incline plane of the pixel electrode 124 faces and is parallel with the corresponding inclined plane of the common electrode 136 so that intervals between the corresponding planes of the pixel electrode 124 and the common electrode 136 are substantially identical overall.

Because the pixel electrode 124 and the common electrode 136 each have the inclined planes, an electric field between the pixel electrode 124 and the common electrode 136 is induced perpendicularly to the inclined planes of the pixel electrode 124 and the common electrode 136.

Accordingly, the liquid crystal molecules 220 are arranged perpendicularly to the induced electric field according to a pixel voltage i.e., a difference voltage between the voltages applied to the pixel electrode 124 and the common electrode 136. In this regard, the liquid crystal molecules 220 are arranged at a tilt angle of about 1 degree to about 5 degrees with respect to the first substrate 112.

In other words, the liquid crystal molecules 220 are arranged perpendicularly to the electric field between the pixel electrode 124 and the common electrode 136, and a refractive index in a direction perpendicular to the electric field is manifested.

Accordingly, to realize a maximum brightness, the polarizing axes of the first and second polarizing plates 120 and 130 are attached to each make a 45 degrees angle with the liquid crystal molecule 220 perpendicular to the electric field.

The backlight unit 160 supplies a scattering light close to a natural light to the liquid crystal panel 110.

As illustrated in FIG. 5A, when a voltage is off, a scattering light from the backlight unit 160 enters the first polarizing plate 120 and a linearly polarized light parallel with the polarizing axis (i.e., the transmission axis) of the first polarizing plate 120 passes through and comes out from the first polarizing plate 120.

However, in the voltage-off state, the liquid crystal molecules 220 are arranged randomly, the liquid crystal molecules 220 and the nano capsule 230 have different anisotropies in refractive index from each other. Accordingly, optically isotropic property is obtained.

Accordingly, the linearly polarized light from the first polarizing plate 120 passes through the nanocapsule liquid crystal layer 200 as is, and does not pass through the second polarizing plate 130 having the polarizing axis perpendicular to the polarizing axis of the first polarizing plate 120. Thus, a black is displayed.

As illustrated in FIG. 5B, when voltages are applied to the pixel electrode 124 and the common electrode 136, the liquid crystal molecules 220 are arranged perpendicularly to the electric field, at an angle of about 1 degree to about 5 degrees with respect to the plane of the first substrate 112.

Accordingly, the nanocapsule liquid crystal layer 200 has an optical anisotropy.

Accordingly, a scattering light from the backlight unit 160 enters through the first polarizing plate 120 so that a linearly polarized light comes out and other part is absorbed, and then a linearly polarized light, which is parallel with the liquid crystal molecules 220, out of the linearly polarized light coming out from the first polarizing light 120, passes through the liquid crystal layer 200.

Then, a linearly polarized light, which is parallel with the polarizing axis of the second polarizing plate 130, out of the linearly polarized light passing through the liquid crystal layer 200 passes through the second polarizing plate 130, and thus a white is displayed.

As described above, the pixel electrode 124 and the common electrode 136 are configured to have the inclined planes, and thus the negative type liquid crystal molecules 220 are arranged at a tilt angle of about 1 degree to 5 degrees with respect to the first substrate 112 by the electric field between the pixel and common electrodes 124 and 136. Accordingly, the negative type liquid crystal molecules can be arranged more uniformly.

In other words, in case that the pixel electrode 124 and the common electrode 136 have the inclined plane, the negative type liquid crystal molecules 220 randomly arranged collide one another without directivity in the process that the molecules 220 are arranged perpendicularly to the electric field induced between the pixel and common electrodes 124 and 136.

Because of such a collision among the liquid crystal molecules 220, the liquid crystal molecules 220 are not arranged in parallel with one another, and this causes a light leakage.

Further, this light leakage causes non-uniformity of brightness and image.

However, according to the pixel and common electrodes 124 and 136 having the slanted plane in this embodiment, the liquid crystal molecules 220 can be more easily rotated and uniformly arranged in the same direction by the electric field perpendicular to the slanted plane of the pixel and common electrodes 124 and 136.

Accordingly, the awry arrangement of the liquid crystal molecules 220 due to the collision can be reduced or prevented, and thus a light leakage by an awry arrangement can be also reduced or prevented.

This can improve the transmittance of the LCD 100.

Further, since the liquid crystal molecules 220 are arranged in parallel at a tilt angle of 1 degree to 5 degrees, rotation of the liquid crystal molecules 220 can be easily made and thus a response time can be more improved.

As described above, in the LCD 100 of the first embodiment, the nanocapsule liquid crystal layer 200 including the nanocapsules 230 that are filled with the negative type liquid crystal molecules 220 and are dispersed in the buffer layer 210 is located between the first and second substrates 112 and 114, and thus a response time can be improved compared with that of the prior art.

Further, since the nanocapsule liquid crystal layer 200 does not have an optically anisotropic initial arrangement, an alignment layer may not be needed in the LCD and a rubbing process may also not be needed.

Further, in case that the nanocapsules 230 are dispersed in the buffer layer 210 made of liquid crystal, the nanocapsule liquid crystal layer 200 is formed in a printing method, coating method, or dispensing method. In case that the nanocapsules 230 are dispersed in the buffer layer 210 made in a film type, the nanocapsule liquid crystal layer 200 is formed in a lamination method. Accordingly, a process of forming a gap between first and second substrates filled with a liquid crystal layer in the prior art can be eliminated, and a process of forming a seal pattern to prevent leakage of liquid crystal in the prior art can be eliminated.

Thus, production efficiency can be improved.

Further, by eliminating the process of forming the alignment layer, in case that the LCD 100 is applied to a touch display device, curved display device or flexible display device, light leakage, which occurs when a rubbing axis is off a desired direction and thus arrangement of liquid crystal molecules goes awry, can be reduced or prevented.

Thus, the LCD 100 can be applicable to a touch display device, curved display device, or flexible display device.

Because the pixel and common electrodes 124 and 136 are formed with a slanted plane, an awry arrangement of the liquid crystal molecules 220 due to a collision in the process of arranging the liquid crystal molecules 220 can be reduced or prevented, and thus a light leakage caused by an awry arrangement can be also reduced or prevented.

This can improve the transmittance of the LCD 100.

Further, since the liquid crystal molecules 220 are arranged in parallel at a tilt angle of 1 degree to 5 degrees with respect to the first substrate 112, rotation of the liquid crystal molecules 220 can be easily made and thus a response time can be further improved.

Figure 6:
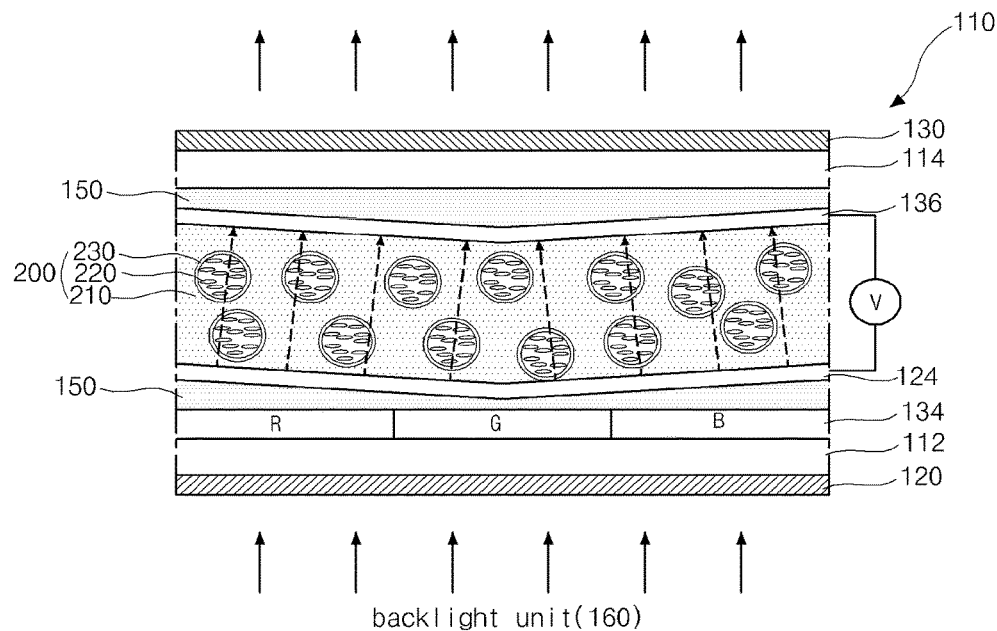
FIG. 6 is a schematic view illustrating a COT type LCD according to the first embodiment of the present invention.

The LCD 100 of the first embodiment may be alternatively configured to have a COT (color filter on transistor) structure, as illustrated in FIG. 6, where the thin film transistor T and the color filter 134 are formed together on the first substrate 112.

In this case, referring to FIGS. 3 and 6, a black matrix is formed on a passivation layer that is on the thin film transistor T, and has a lattice shape. Red, green and blue color filters are formed on the black matrix and fill openings of the lattice of the black matrix in the respective pixel regions P. The pixel electrode 124 is formed on the color filter, and the common electrode 136 is formed on the second substrate 114 and faces the pixel with the nanocapsule liquid crystal layer between the common electrode 136 and the pixel electrode 124.

Figure 7:
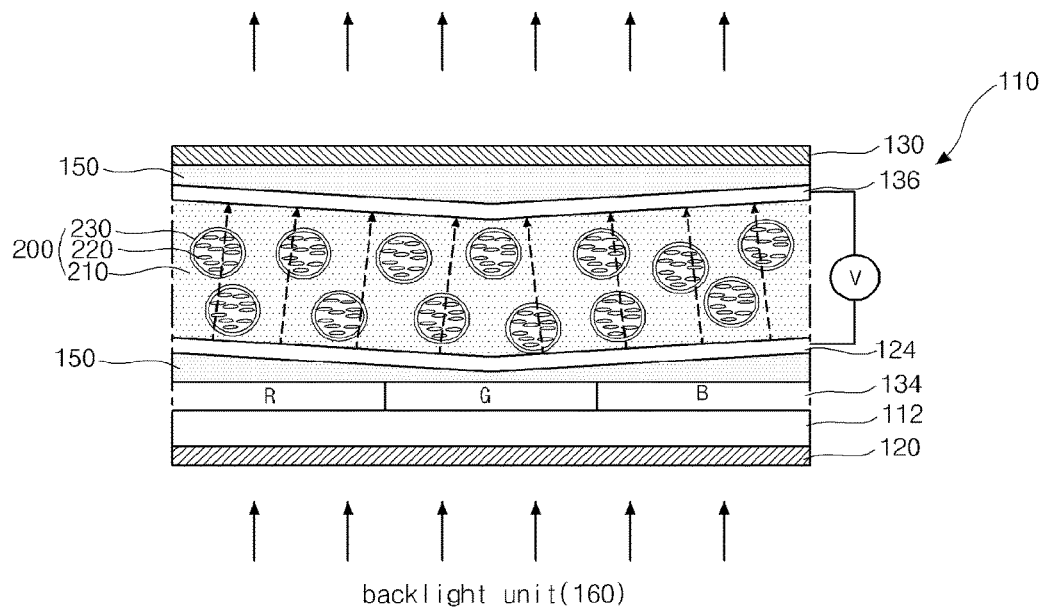
FIG. 7 is a schematic view illustrating a COT type LCD without a second substrate according to the first embodiment of the present invention.

Alternatively, as illustrated in FIG. 7, a COT type LCD may be configured not to have a second substrate, and in this case, the common electrode 136 may be formed on an inner surface of the second polarizing plate 130.

Second Embodiment

Figure 8A:
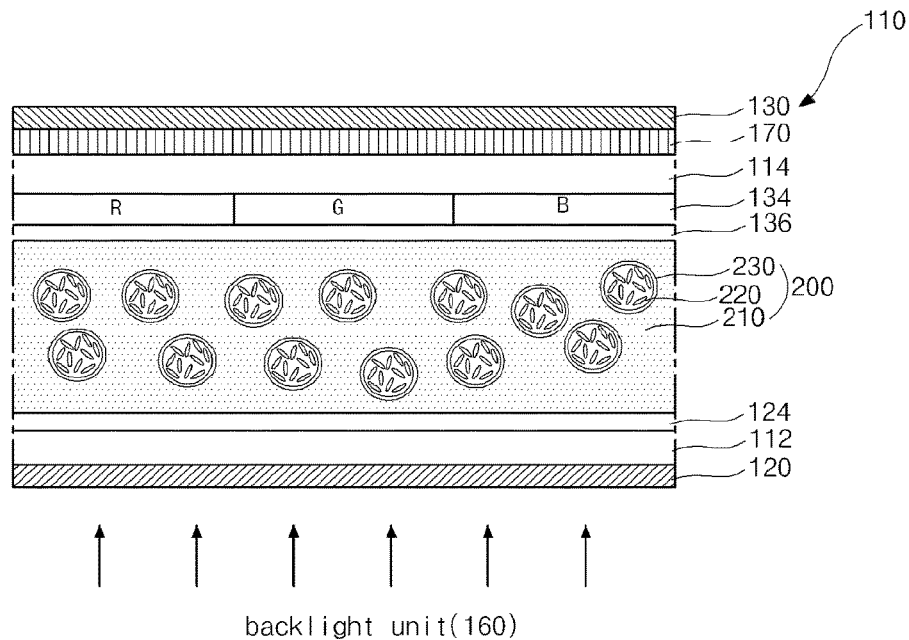
FIGS. 8A and 8B are schematic views illustrating an LCD according to a second embodiment of the present invention.
Figure 8B:
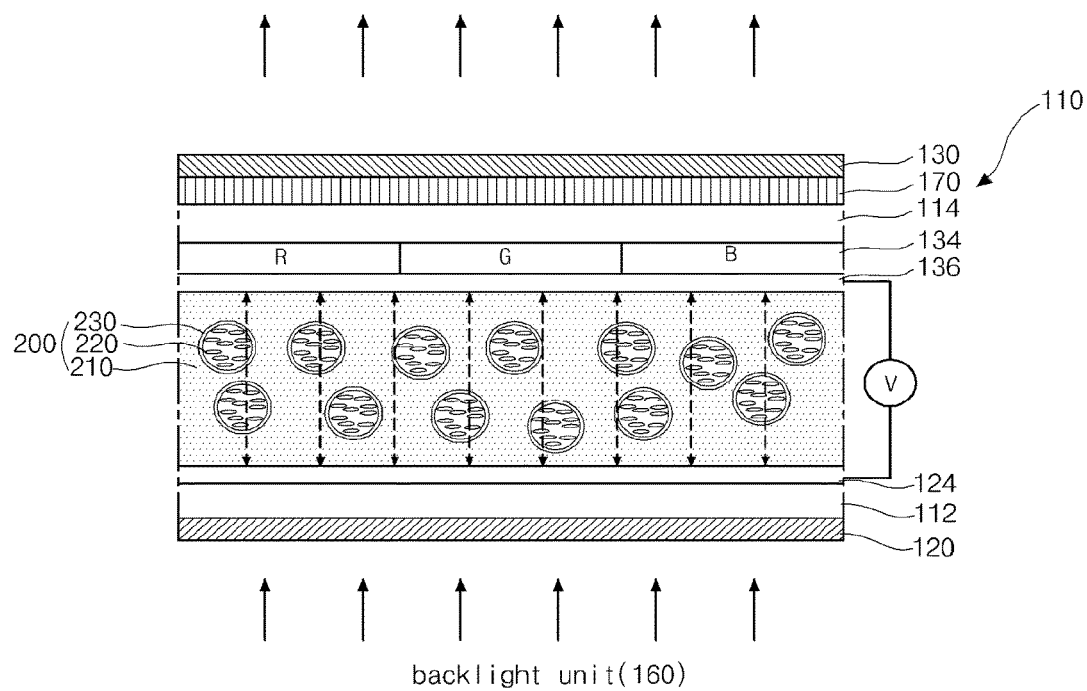

FIGS. 8A and 8B are schematic views illustrating an LCD according to a second embodiment of the present invention. Explanations of parts similar to parts of the above first embodiment may be omitted.

Referring to FIGS. 8A and 8B, the LCD (100 of FIG. 3) of the second embodiment includes the liquid crystal panel 110 and the backlight unit 160.

The liquid crystal panel 110 includes the first and second substrates 112 and 114 facing each other, the nanocapsule liquid crystal layer 200, and the first and second polarizing plates 120 and 130 on the outer surfaces of the first and second substrates 112 and 114, respectively.

The liquid crystal panel 110 may be a vertical alignment (VA) mode liquid crystal panel. The thin film transistor (T of FIG. 3) and the pixel electrode 124 are formed on the inner surface of the first substrate 112. The black matrix (132 of FIG. 3), the color filters 134, and the common electrode 136 are formed on the inner surface of the second substrate 114. An overcoat layer may be formed covering the black matrix 132 and the color filters 134.

The negative type nematic liquid crystal molecules 220 of the nanocapsule liquid crystal layer 200 are arranged perpendicularly to the electric field that is perpendicular to the plane of the first and second substrates 112 and 114, and a refraction index in a direction perpendicular to the electric field is manifested.

Accordingly, to realize a maximum brightness, the polarizing axes of the first and second polarizing plates 120 and 130 are attached to each make a 45 degree angle with the liquid crystal molecules 220 perpendicular to the electric field.

The backlight unit 160 supplies a scattering light close to a natural light to the liquid crystal panel 110.

One of the particular components of this second embodiment is a phase retardation film 170 between the second substrate 114 and the second polarizing plate 130.

The phase retardation film 170 may be formed of a λ/4 wave plate (quarter wave plate).

In this regard, as illustrated in FIG. 8A, when a voltage is off, a scattering light from the backlight unit 160 enters the first polarizing plate 120 and a linearly polarized light parallel with the polarizing axis of the first polarizing plate 120 passes through and comes out from the first polarizing plate 120.

However, in the voltage-off state, the liquid crystal molecules 220 are arranged randomly, the liquid crystal molecules 220 and the nano capsule 230 have different anisotropies in refractive index from each other. Accordingly, optically isotropic property is obtained.

Accordingly, the linearly polarized light from the first polarizing plate 120 passes through the nanocapsule liquid crystal layer 200 as is, and does not pass through the second polarizing plate 130 having the polarizing axis perpendicular to the polarizing axis of the first polarizing plate 120. Thus, a black is displayed.

As illustrated in FIG. 8B, when voltages are applied to the pixel electrode 124 and the common electrode 136, the liquid crystal molecules 220 are arranged perpendicularly to the electric field between the pixel and common electrodes 124 and 136.

Accordingly, the nanocapsule liquid crystal layer 200 has an optical anisotropy.

Accordingly, a scattering light from the backlight unit 160 enters through the first polarizing plate 120 so that a linearly polarized light comes out and other part is absorbed, and then a linearly polarized light, which is parallel with the liquid crystal molecules 220, out of the linearly polarized light coming out from the first polarizing light 120, passes through the liquid crystal layer 200.

Then, the linearly polarized light passing through the liquid crystal layer 200 is modified by the phase retardation film 170 into a circularly polarized light, and then the circularly polarized light is modified into a linearly polarized light, which is parallel with the polarizing axis of the second polarizing plate 130, while passing through the second polarizing plate 130. Thus, a white is displayed.

In this regard, since the LCD 100 of the second embodiment includes the phase retardation film 170 between the second substrate 114 and the second polarizing plate 130, a light leakage can be reduced or prevented, and non-uniformity of brightness and image can be reduced or prevented.

In more detail, the negative type liquid crystal molecules 220 randomly arranged collide one another without directivity in the process that the molecules 220 are arranged perpendicularly to the electric field induced between the pixel and common electrodes 124 and 136.

Because of this collision among the liquid crystal molecules 220, the liquid crystal molecules 220 are not arranged in parallel with one another, and this causes a light leakage. Further, this light leakage causes non-uniformity of brightness and image.

However, according to the phase retardation film 170 between the second substrate 114 and the second polarizing plate 130 in the second embodiment, the linearly polarized light from the nanocapsule liquid crystal layer 200 is modified into the circularly polarized light, which then enters the second polarizing plate 130. Accordingly, light leakage can be reduced or prevented, and thus non-uniformity of brightness and image can be reduced or prevented.

As described above, the response time can be improved, and the process of forming an alignment layer, the process of forming a cell gap, the process of forming a seal pattern can be eliminated, and thus production efficiency can be improved.

Further, the LCD 100 can be applied to a touch display device, curved display device, or flexible display device.

Particularly, by providing the phase retardation film 170 between the second substrate 114 and the second polarizing plate 130, the linearly polarized light is modified by the phase retardation film 170 into a circularly polarized light, which then enters the second polarizing plate 130. Accordingly, a light leakage can be reduced or prevented. Thus, non-uniformity of brightness and image due to such a light leakage can be reduced or prevented.

Figure 9:
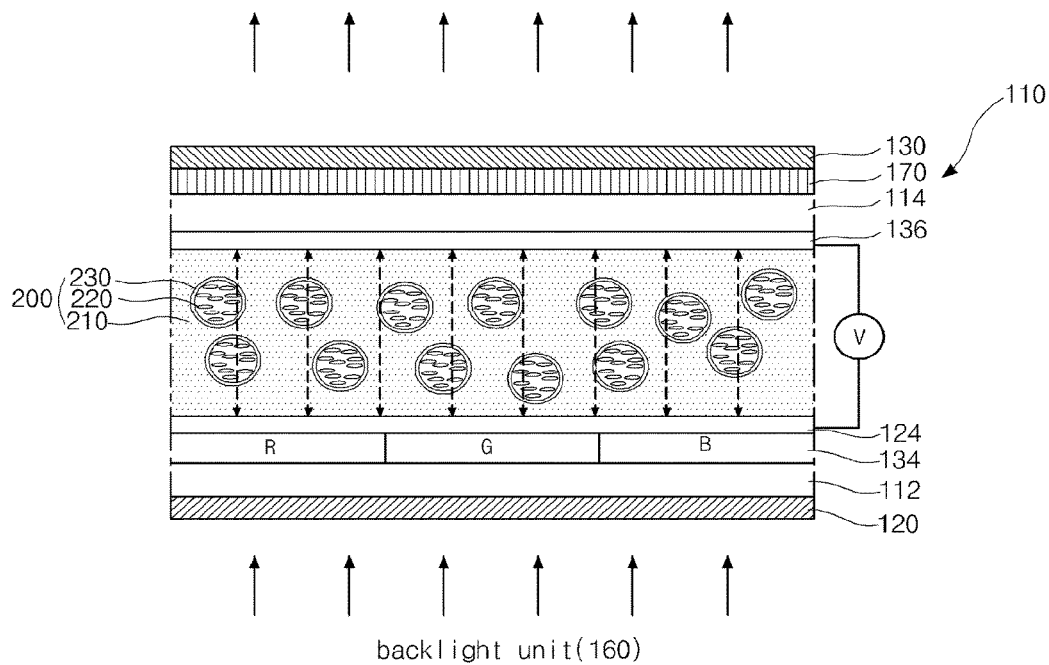
FIG. 9 is a schematic view illustrating a COT type LCD according to the second embodiment of the present invention.

The LCD 100 of the second embodiment may be alternatively configured to have a COT (color filter on transistor) structure, as illustrated in FIG. 9, where the thin film transistor T and the color filter 134 are formed together on the first substrate 112.

In this case, referring to FIGS. 3 and 9, a black matrix is formed on a passivation layer that is on the thin film transistor T, and has a lattice shape. Red, green and blue color filters are formed on the black matrix and fill openings of the lattice of the black matrix in the respective pixel regions P. The pixel electrode 124 is formed on the color filter, and the common electrode 136 is formed on the second substrate 114 and faces the pixel with the nanocapsule liquid crystal layer between the common electrode 136 and the pixel electrode 124.

Figure 10:
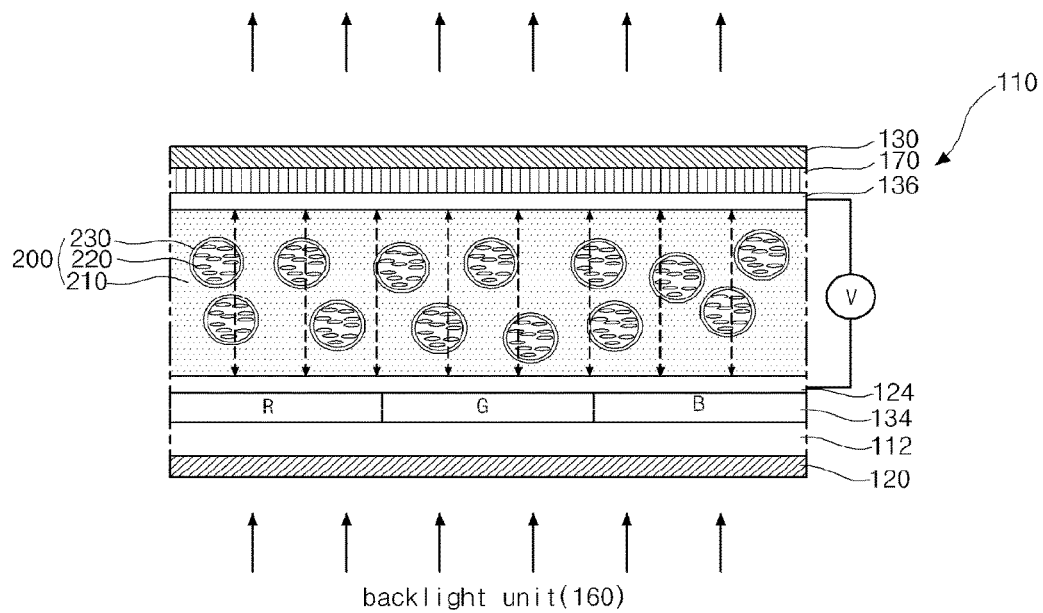
FIG. 10 is a schematic view illustrating a COT type LCD without a second substrate according to the second embodiment of the present invention.

Alternatively, as illustrated in FIG. 10, a COT type LCD may be configured not to have a second substrate, and in this case, the common electrode 136 may be formed on an inner surface of the phase retardation film 170.

Third Embodiment

Figure 11A:
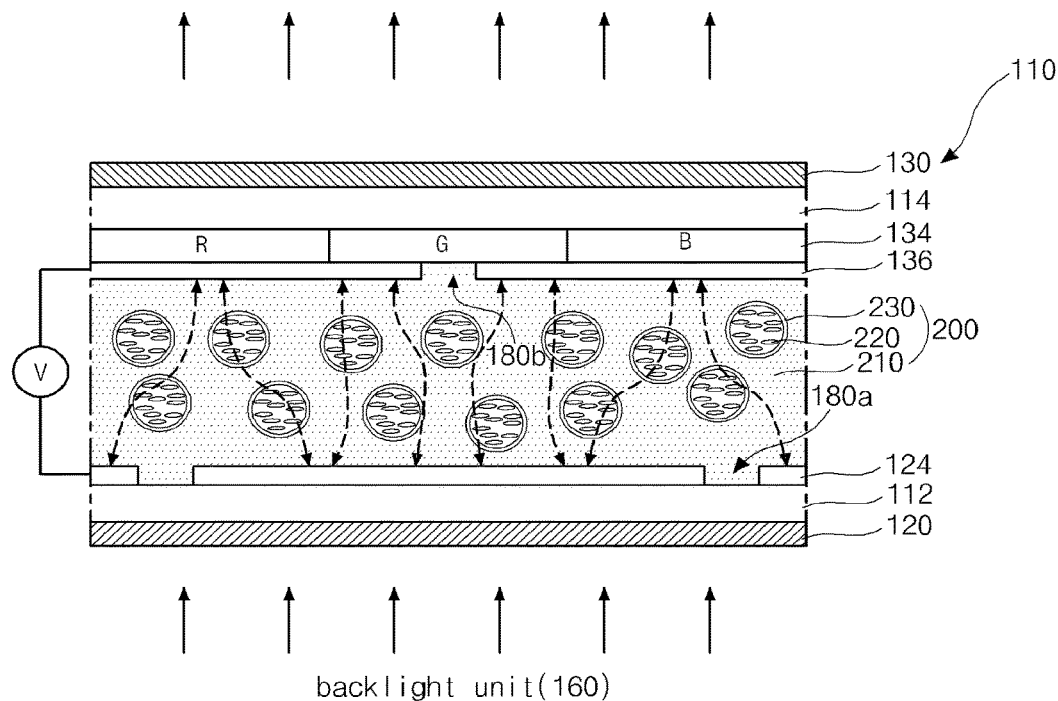
FIG. 11A is a schematic view illustrating an LCD according to a third embodiment of the present invention.

FIG. 11A is a schematic view illustrating an LCD according to a third embodiment of the present invention. Explanations of parts similar to parts of the above first and second embodiments may be omitted.

Referring to FIG. 11A, the LCD (100 of FIG. 3) of the third embodiment includes the liquid crystal panel 110 and the backlight unit 160.

The liquid crystal panel 110 includes the first and second substrates 112 and 114 facing each other, the nanocapsule liquid crystal layer 200, and the first and second polarizing plates 120 and 130 on the outer surfaces of the first and second substrates 112 and 114, respectively.

The liquid crystal panel 110 may be a vertical alignment (VA) mode liquid crystal panel. The thin film transistor (T of FIG. 3) and the pixel electrode 124 are formed on the inner surface of the first substrate 112. The black matrix (132 of FIG. 3), the color filters 134, and the common electrode 136 are formed on the inner surface of the second substrate 114. An overcoat layer may be formed covering the black matrix 132 and the color filters 134.

The pixel electrode 124 and the common electrode 136 have first and second slits 180a and 180b, respectively.

In other words, the pixel electrodes 124 are spaced apart from each other to form the first slits 180a, and similarly, the common electrodes 136 are spaced apart from each other to form the second slits 180b.

The first slit 180a has a width much less than a width of the pixel electrode 124. In other words, the width of the pixel electrode 124 is a few to a few tens of times the width of the first slit 180a.

The first and second slits 180a and 180a alternate. It is preferred that each first slit 180a is located at a center portion of the corresponding common electrode 136 that is between the neighboring second slits 180b, and each second slit 180b is located at a center portion of the corresponding pixel electrode 124 that is between the neighboring first slits 180a.

Accordingly, when voltages are applied to the pixel electrode 124 and the common electrode 136, a fringe electric field inclined from a direction perpendicular to the plane of the first and second substrates 112 and 114 is realized.

Accordingly, the negative type liquid crystal molecules 220 are arranged perpendicularly to the fringe electric field between the pixel and common electrodes 124 and 136, and a refraction index perpendicular to the fringe electric field is manifested.

Accordingly, the nanocapsule liquid crystal layer 200 has an optical anisotropy.

Accordingly, a scattering light from the backlight unit 160 enters through the first polarizing plate 120 so that a linearly polarized light comes out and other part is absorbed, and then a linearly polarized light, which is parallel with the liquid crystal molecules 220, out of the linearly polarized light coming out from the first polarizing light 120, passes through the liquid crystal layer 200.

Then, a linearly polarized light, which is parallel with the polarizing axis of the second polarizing plate 130, out of the linearly polarized light coming out from the nanocapsule liquid crystal layer 200 passes through the second polarizing plate 130, and thus a white is displayed.

In this regard, since the LCD 100 of the third embodiment includes the pixel electrode 124 and the common electrode 136 having the first slit 180a and the second slit 180b, respectively, and generates the fringe electric field between the pixel and common electrodes 124 and 136, the negative type liquid crystal molecules 220 are arranged perpendicularly to the fringe electric field. Accordingly, the liquid crystal molecules 220 can be arranged more uniformly in parallel.

In other words, the liquid crystal molecules 220 randomly arranged are more easily rotated and arranged because of the fringe electric field.

Accordingly, an awry arrangement of the liquid crystal molecules 220 because of collision among the molecules 220 in the process that the molecules 220 are arranged perpendicularly can be reduced or prevented, and thus a light leakage due to the awry arrangement can be reduced or prevented.

Further, transmittance of the LCD 100 can be improved.

Further, since the liquid crystal molecules 220 are arranged perpendicularly to the fringe electric field between the pixel and common electrodes 124 and 136, rotation is more easily made and thus response time is improved.

As described above, the response time can be improved, and the process of forming an alignment layer, the process of forming a cell gap, the process of forming a seal pattern can be eliminated, and thus production efficiency can be improved.

Further, the LCD 100 is applicable to a touch display device, curved display device, or flexible display device.

Particularly, since the pixel electrode 124 and the common electrode 136 are configured to have the first slit 180a and the second slit 180b, respectively, and generate the fringe electric field between the pixel and common electrodes 124 and 136, the negative type liquid crystal molecules 220 are arranged in parallel with one another and perpendicularly to the fringe electric field, and thus a light leakage can be reduced or prevented.

Thus, non-uniformity of brightness and image due to the light leakage can be reduced or prevented.

Figure 11B:
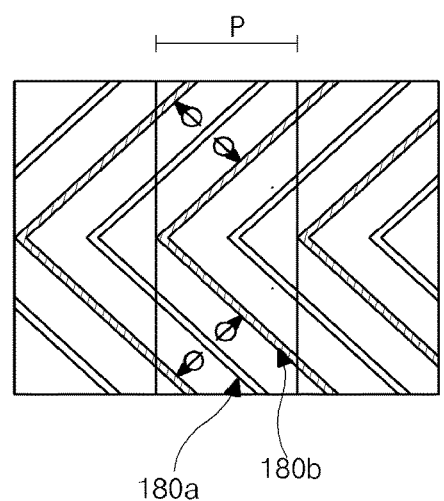
FIG. 11B is a schematic view illustrating multi-domains of FIG. 11A.

Since the liquid crystal molecules 220 have substantially uniform and consistent arrangement corresponding to the second slit 180b, when the second slit 180b is configured to have a bent shape vertically symmetrical in the pixel region P, as illustrated in FIG. 11B, four different domains at up, down, left and right sides in each pixel region P can be obtained. In this case, the second slit 180b is bent at a center portion of the pixel region P, and the first slit 180a is bent like the second slit 180b.

Alternatively, even though not shown in the drawings, when a plurality of second slits 180b are configured to be located and bent to be vertically symmetrical in a pixel region, multi-domains that are four times the number of the plurality of second slits 180b may be formed in each pixel region P.

Fourth Embodiment

Figure 12A:
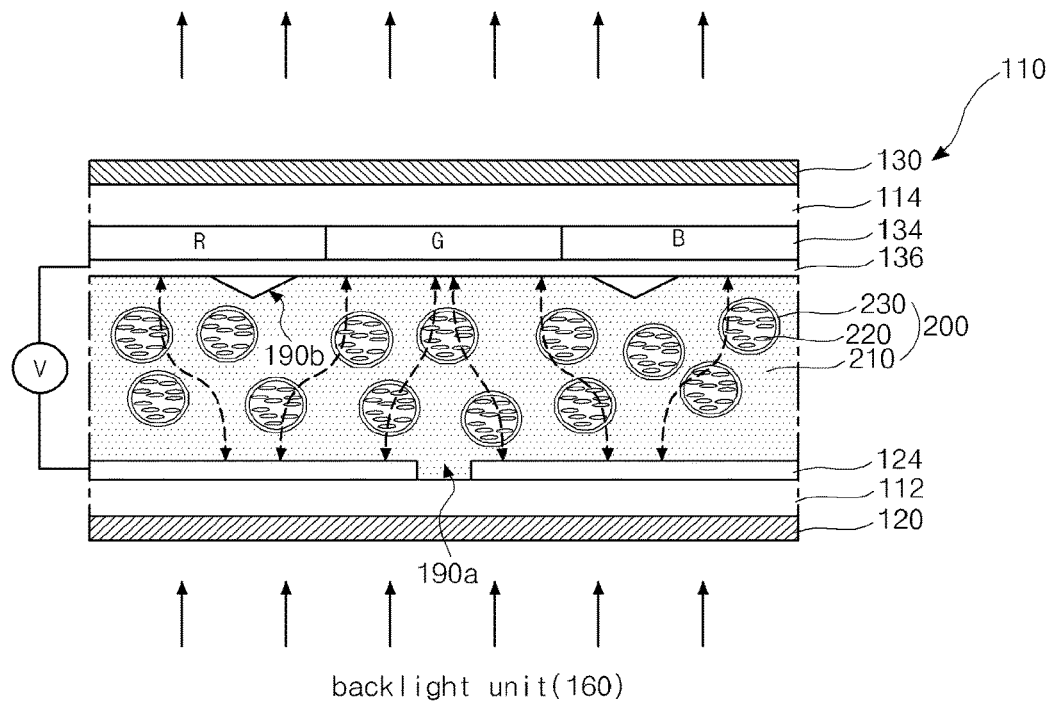
FIG. 12A is a schematic view illustrating an LCD according to a fourth embodiment of the present invention.

FIG. 12A is a schematic view illustrating an LCD according to a fourth embodiment of the present invention. Explanations of parts similar to parts of the above first to third embodiments may be omitted.

Referring to FIG. 12A, the LCD (100 of FIG. 3) of the fourth embodiment includes the liquid crystal panel 110 and the backlight unit 160.

The liquid crystal panel 110 includes the first and second substrates 112 and 114 facing each other, the nanocapsule liquid crystal layer 200, and the first and second polarizing plates 120 and 130 on the outer surfaces of the first and second substrates 112 and 114, respectively.

The liquid crystal panel 110 may be a vertical alignment (VA) mode liquid crystal panel. The thin film transistor (T of FIG. 3) and the pixel electrode 124 are formed on the inner surface of the first substrate 112. The black matrix (132 of FIG. 3), the color filters 134, and the common electrode 136 are formed on the inner surface of the second substrate 114. An overcoat layer may be formed covering the black matrix 132 and the color filters 134.

The pixel electrode 124 has a pixel slit 190a, and a common protrusion 190b is formed on the common electrode 136.

In other words, the pixel electrodes 124 are spaced apart from each other to form the pixel slits 190a, and the common protrusions 190b are spaced apart from each other on the common electrode 136.

The common protrusion 190b may have a triangular shape in a cross-section. Alternatively, the common electrode 190b may have other shapes, for example, a semi-circular or semi-elliptical shape.

The common protrusions 190b and the pixel slits 190a are arranged alternately and parallel with each other in a pixel region in a plan view, and are arranged alternately in a zigzag form with the liquid crystal layer 200 therebetween in a cross-sectional view.

In other words, the pixel slit 190a is located corresponding to a separate region between the neighboring common protrusions 190b, and each common protrusion 190b are located at a center portion of the corresponding pixel electrode 124 that is between the neighboring pixel slits 190a.

Accordingly, when voltages are applied to the pixel electrode 124 and the common electrode 136, a fringe electric field inclined from a direction perpendicular to the plane of the first and second substrates 112 and 114 is realized.

Accordingly, the negative type liquid crystal molecules 220 are arranged perpendicularly to the fringe electric field between the pixel and common electrodes 124 and 136, and a refraction index perpendicular to the fringe electric field is manifested.

Accordingly, the nanocapsule liquid crystal layer 200 has an optical anisotropy.

Accordingly, a scattering light from the backlight unit 160 enters through the first polarizing plate 120 so that a linearly polarized light comes out and other part is absorbed, and then a linearly polarized light, which is parallel with the liquid crystal molecules 220, out of the linearly polarized light coming out from the first polarizing light 120, passes through the liquid crystal layer 200.

Then, a linearly polarized light, which is parallel with the polarizing axis of the second polarizing plate 130, out of the linearly polarized light coming out from the nanocapsule liquid crystal layer 200 passes through the second polarizing plate 130, and thus a white is displayed.

In this regard, since the LCD 100 of the fourth embodiment includes the pixel electrode 124 and the common electrode 136 having the pixel slit 190a and the common protrusion 190b, respectively, and generates the fringe electric field between the pixel and common electrodes 124 and 136, the negative type liquid crystal molecules 220 are arranged perpendicularly to the fringe electric field. Accordingly, the liquid crystal molecules 220 can be arranged more uniformly in parallel.

In other words, the liquid crystal molecules 220 randomly arranged are more easily rotated and arranged because of the fringe electric field.

Accordingly, an awry arrangement of the liquid crystal molecules 220 because of collision among the molecules 220 in the process that the molecules 220 are arranged perpendicularly can be reduced or prevented, and thus light leakage due to the awry arrangement can be reduced or prevented.

Further, transmittance of the LCD 100 can be improved.

Further, since the liquid crystal molecules 220 are arranged perpendicularly to the fringe electric field between the pixel and common electrodes 124 and 136, rotation is more easily made and thus response time is improved.

As described above, the response time can be improved, and the process of forming an alignment layer, the process of forming a cell gap, the process of forming a seal pattern can be eliminated, and thus production efficiency can be improved.

Further, the LCD 100 can be applied to a touch display device, curved display device, or flexible display device.

Particularly, since the pixel electrode 124 and the common electrode 136 are configured to have the pixel slit 190a and the common protrusion 190b, respectively, and generate the fringe electric field between the pixel and common electrodes 124 and 136, the negative type liquid crystal molecules 220 are arranged in parallel with one another and perpendicularly to the fringe electric field, and thus light leakage can be prevented.

Thus, non-uniformity of brightness and image due to the light leakage can be reduced or prevented.

Figure 12B:
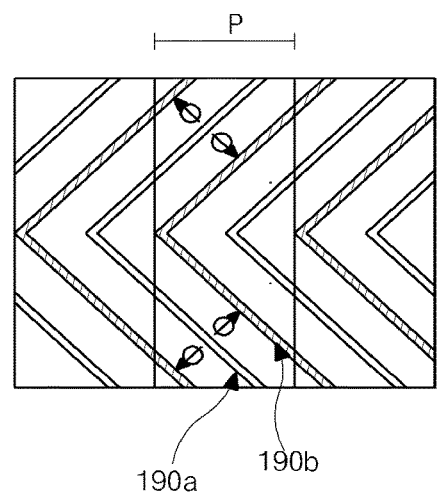
FIG. 12B is a schematic view illustrating multi-domains of FIG. 12A.

Since the liquid crystal molecules 220 have substantially uniform and consistent arrangement corresponding to the common protrusion 190b, when the common protrusion 190b is configured to have a bent shape vertically symmetrical in the pixel region P, as illustrated in FIG. 12B, four different domains at up, down, left and right sides in each pixel region P can be obtained. In this case, the pixel slit 190a is bent like the common protrusion 190b.

Fifth and sixth embodiments of the present invention, which will now be described, relate to a reflective type LCD.

Fifth Embodiment

Figure 13:
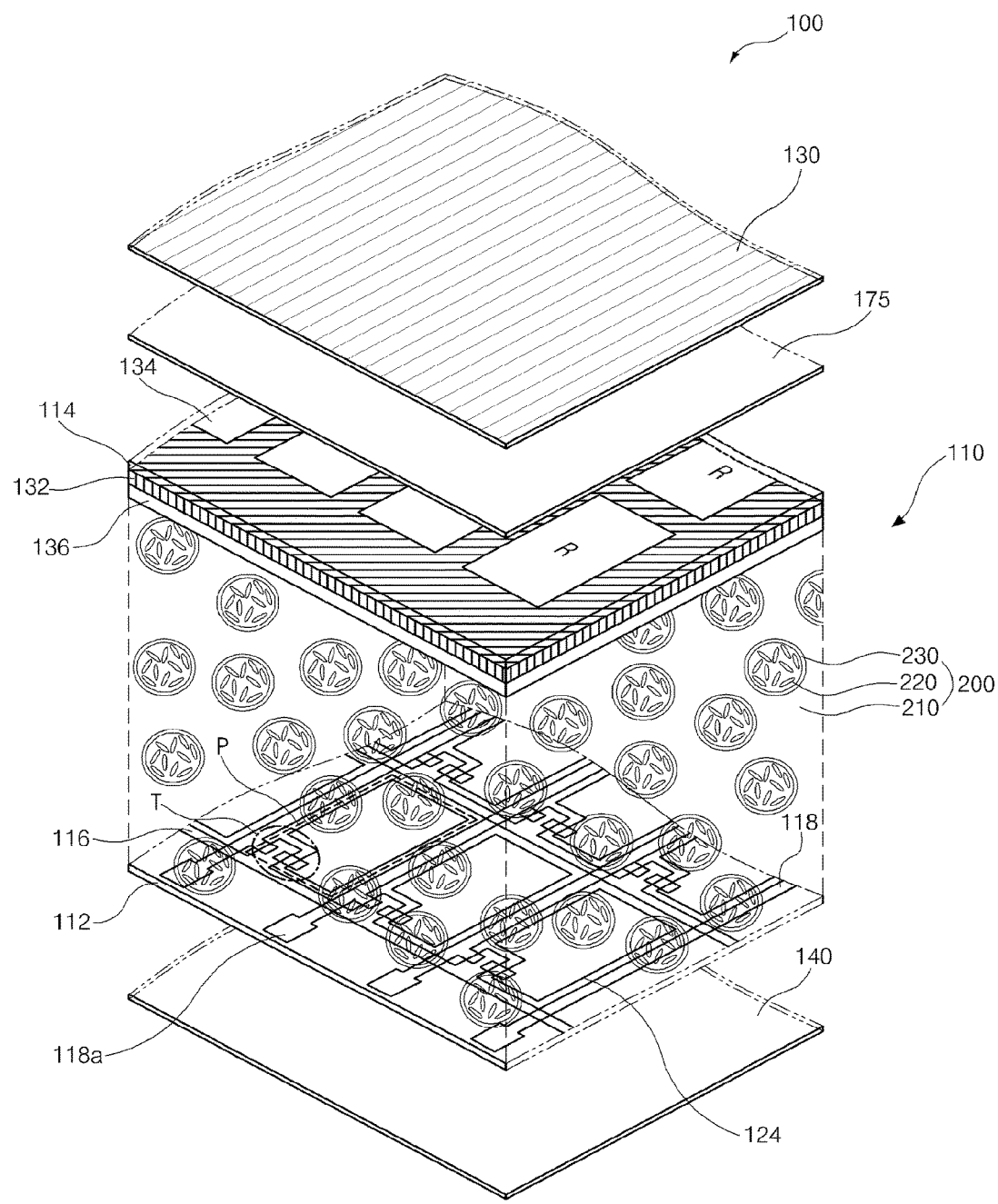
FIG. 13 is a perspective view illustrating an LCD according to a fifth embodiment of the present invention.

FIG. 13 is a perspective view illustrating an LCD according to the fifth embodiment of the present invention. Explanations of parts similar to parts of the above first to fourth embodiments may be omitted.

Referring to FIG. 13, the LCD 100 includes a liquid crystal panel 110, a polarizing plate 130, a phase retardation plate 175, and a reflection plate 140. The LCD 100 using the reflection plate 140 is referred to as a reflective type LCD.

The liquid crystal panel 110 includes a first substrate 112, a second substrate 114, and a nanocapsule liquid crystal layer 200 between the first and second substrates 112 and 114.

The first substrate 112 is referred to as a lower substrate or an array substrate. A plurality of gate lines 116 and a plurality of data lines 118 cross each other on an inner surface of the first substrate 112 to define a plurality of pixel regions P.

A thin film transistor T is formed near the crossing portion of the gate and data lines 116 and 118, and is connected to a pixel electrode 124 in the pixel region P.

The second substrate 114 is referred to as an upper substrate or a color filter substrate. A black matrix 132 is on an inner surface of the second substrate 114, and shields a non-display element such as the gate line 116, the data line 118, and the thin film transistor T exposing the pixel electrode 124. The black matrix 132 has a lattice shape surrounding the pixel region P.

Red, green and blue color filters 134 fill openings of the black matrix 132 corresponding to the respective pixel regions P. A common electrode 136 covers the black matrix 132 and the color filters 134.

Even though not shown in the drawings, the first substrate 112 has an area greater than that of the second substrate 114 so that a peripheral portion of the first substrate 112 is exposed outside the second substrate 114. In the exposed portion of the first substrate 112, data pads 118a connected to the respective data lines 118, and gate pads (not shown) connected to the respective gate lines 116 are formed.

When a gate line 116 is selected and supplied with a turn-on gate signal i.e., high-level gate signal, the thin film transistor T connected to the selected gate line 116 is turned on and an image data signal is transferred to the pixel electrode 124 through the data line 118. Accordingly, an electric field is induced between the pixel electrode 124 and the common electrode 136 and controls liquid crystal molecules 220 of the nanocapsule liquid crystal layer 200, and thus light transmittance is changed to display images.

The polarizing plate 130 is attached on an outer surface of the second substrate 114.

The phase retardation plate 175 is located between the second substrate 114 and the polarizing plate 130. The phase retardation plate 175 may be a λ/4 plate (a quarter wave plate).

It is preferred that three refractive indices nx, ny and nz of the phase retardation plate 175 meet the following relation: nx=ny>nz. The phase retardation plate 175 and the polarization plate 130 may be formed as one body.

The reflection plate 140 is located on an outer surface of the first substrate 112. The reflection plate 140 reflects an external light from the outside into the liquid crystal panel 110.

The reflection plate 140 may be fat lied of a metal material such as aluminum (Al) to increase reflectance.

Alternatively, the reflection plate 140 may be located between the first substrate 112 and the nanocapsule liquid crystal layer 200. In this case, the reflection plate 140 may function as a reflection electrode and have an embossing pattern for diffused reflection.

The nanocapsule liquid crystal layer 200 is an optically isotropic type liquid crystal layer in a normal state. Accordingly, when no electric field between the pixel electrode 124 and the common electrode 136 is applied to the nanocapsule liquid crystal layer 200, the nanocapsule liquid crystal layer 200 is optically isotropic, and when an electric field is applied, the nanocapsule liquid crystal layer 200 has a birefringence property in a direction perpendicular to the applied electric field.

In other words, in case that the liquid crystal molecules 220 are negative type nematic liquid crystal molecules, the liquid crystal molecules 220 are arranged perpendicularly to an electric field to generate a birefringence. In case that the liquid crystal molecules 220 are positive type nematic liquid crystal molecules, the liquid crystal molecules 220 are arranged in parallel with an electric field to generate a birefringence property.

Accordingly, when an electric field is applied, the nanocapsule liquid crystal layer 200 has an optically uniaxial property In more detail, the liquid crystal molecules 220 are contained within the capsule 230 having a nanosize, and the liquid crystal molecules 220 are irregularly arranged in the nanocapsule 230.

The nanocapsule 230 may have about 5% to about 95% of a total volume of the nanocapsule liquid crystal layer 200, and preferably, may have about 25% to about 65% of the total volume of the nanocapsule liquid crystal layer 200. The buffer layer 210 occupies the rest of the total volume.

The buffer layer 210 may be made of a transparent or semi-transparent material and have water-solubility, fat-solubility, or mixture of water-solubility and fat-solubility. The buffer layer 210 may be heat cured or UV cured.

The buffer layer 210 may have an additive to increase strength and reduce curing time.

The nanocapsule 230 may have a diameter of about 1 nm to about 320 nm, and preferable, about 30 nm to about 100 nm.

Since the nanocapsule 230 has a diameter less than any wavelengths of visible light, there occurs substantially no optical change due to refractive index, and optically isotropic property can be obtained. Further, scattering of visible light can be reduced or minimized.

Particularly, when the nanocapsule 230 is formed with a diameter of about 100 nm or less, high contrast ratio can be obtained.

A thickness of the nanocapsule liquid crystal layer 200 (i.e., a cell gap) is preferably about 1 um to about 10 um, and more preferably about 2 um to about 5 um.

In case that the cell gap is 2 um or less, it is difficult to externally recognize a difference in light transmittance.

In case that the cell gap is Sum or more, a distance between electrodes is great, and thus high power consumption is required. Further, an overall thickness of the liquid crystal panel 110 increases, and thus it is difficult to provide an LCD having lightweight and thin profile.

The irregularly arranged liquid crystal molecules 220 and the nanocapsule 230 have different refractive indices, and thus a light scattering may be caused at the interface therebetween. Accordingly, when light passes through the interface, the light is scattered and becomes opaque in milk white.

However, when an electric field is applied to the nanocapsule liquid crystal layer 200, the liquid crystal molecules 220 filling the nanocapsule 230 are regularly arranged.

In this state, the refractive index of the liquid crystal molecules 220 is changed. In order to reduce or minimize a light scattering at the interface between the nanocapsule 230 and the liquid crystal molecules 220, the nanocapsule 230 and the regularly arranged liquid crystal molecules 220 are formed such that they have refractive indices that are substantially close to each other, Therefore, the nanocapsule liquid crystal layer 200 can be seen transparent.

In this case, it is preferred that a difference between the refractive index of the nanocapsule 220 and the refractive index of the liquid crystal molecule 220 is within about ±0.1. The average refractive index (n) of the liquid crystal molecule 220 may be defined as follows: $n=[(ne+2*no)/3]$ (where ne is a refractive index of a major axis of the liquid crystal molecule 220, and no is a refractive index of a minor axis of the liquid crystal molecule 220).

Accordingly, the LCD 100 including the nanocapsule liquid crystal layer 200 can be used as a display device, with its transmittance changing according to a variation of the voltage applied.

Further, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Further, in case that the nanocapsules 230 are dispersed in the buffer layer 210 made of, for example, liquid crystal, the nanocapsule liquid crystal layer 200 may be formed, for example, by a printing method, coating method, or dispensing method. In case that the nanocapsules 230 are dispersed in the buffer layer 210 made in a film type, the nanocapsule liquid crystal layer 200 may be formed, for example, by a lamination method. Accordingly, a process of forming a gap between the first and second substrates filled with the liquid crystal layer (50 of FIG. 1) in the prior art can be eliminated, and a process of forming the seal pattern (70 of FIG. 1) in the prior art can be eliminated.

Therefore, production efficiency can be improved.

Further, even when an external force such as a user's touch is applied to the LCD 100 of the embodiment, the liquid crystal molecules 220 are in the nanocapsule 230 having a size less than the wavelength of visible light, thus there is substantially no influence of visible light, and thus a light leakage due to the external force can be reduced or prevented.

Accordingly, in case that the LCD 100 of the embodiment is applied to a flexible display device, even when an external force is applied to the LCD 100, because of the nanocapsule 230 having a size less than the wavelength of visible light, a light leakage due to the external force can be reduced or prevented.

Further, when the electric field is induced between the first and second substrates 112 and 114, the liquid crystal molecules 220 are dynamically rotated, and thus response speed can be fast.

Figure 14A:
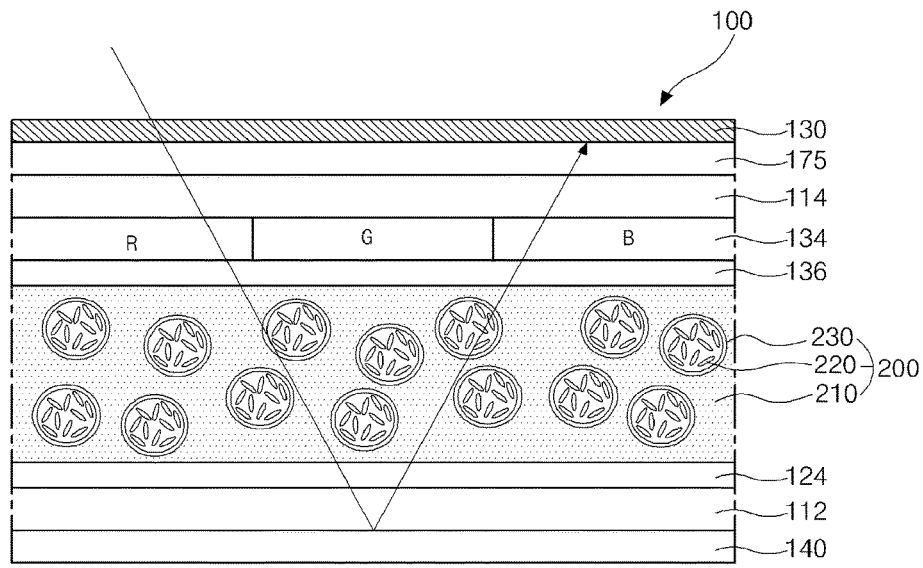
FIGS. 14A and 14B are schematic views illustrating an image display principle of an LCD according to the fifth embodiment of the present invention.
Figure 14B:
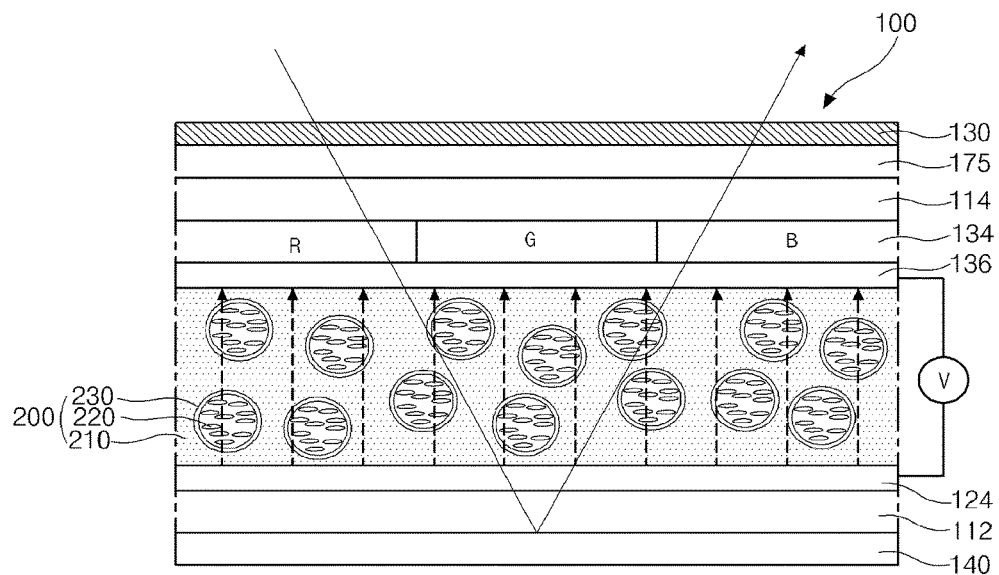
Figure 15A:
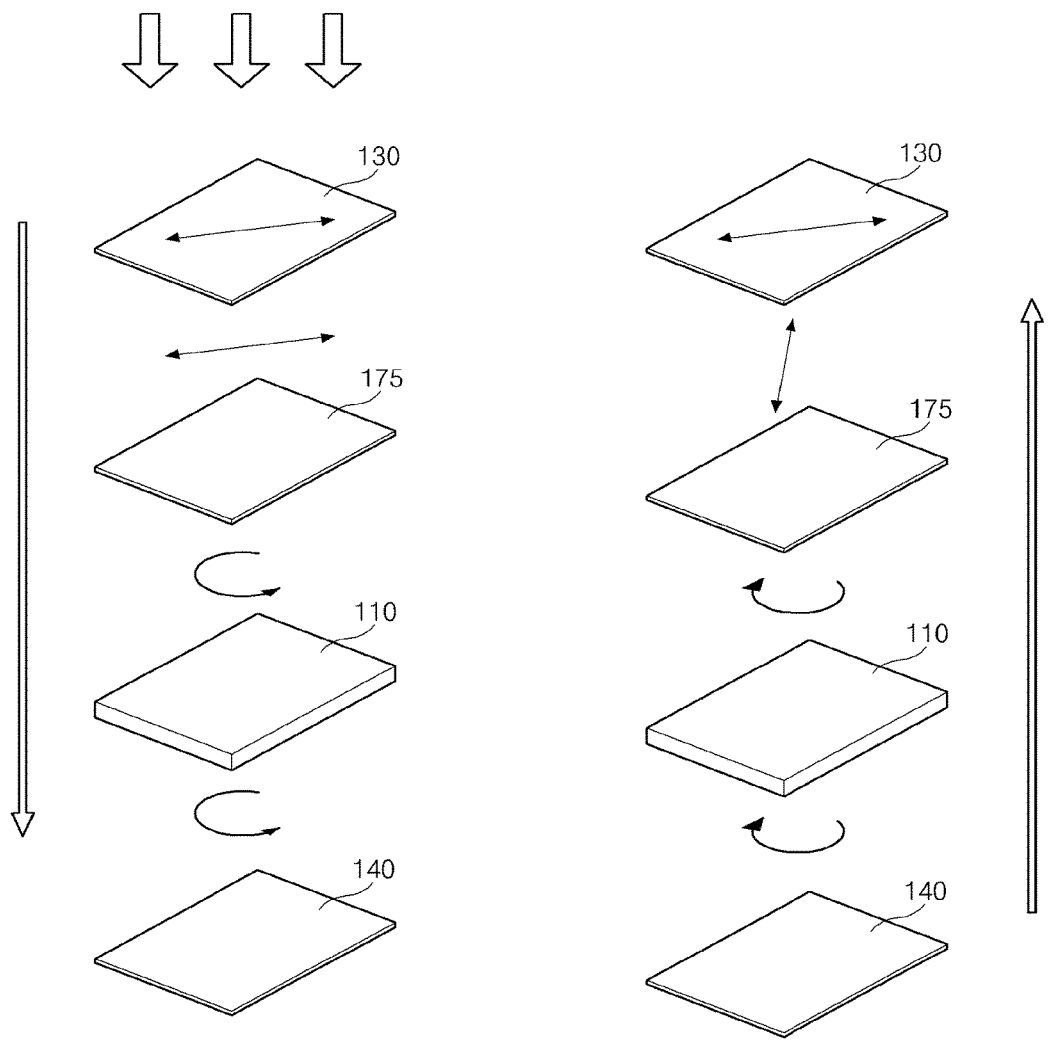
FIGS. 15A and 15B are schematic views illustrating variation of light in the states of FIGS. 14A and 14B, respectively.
Figure 15B:
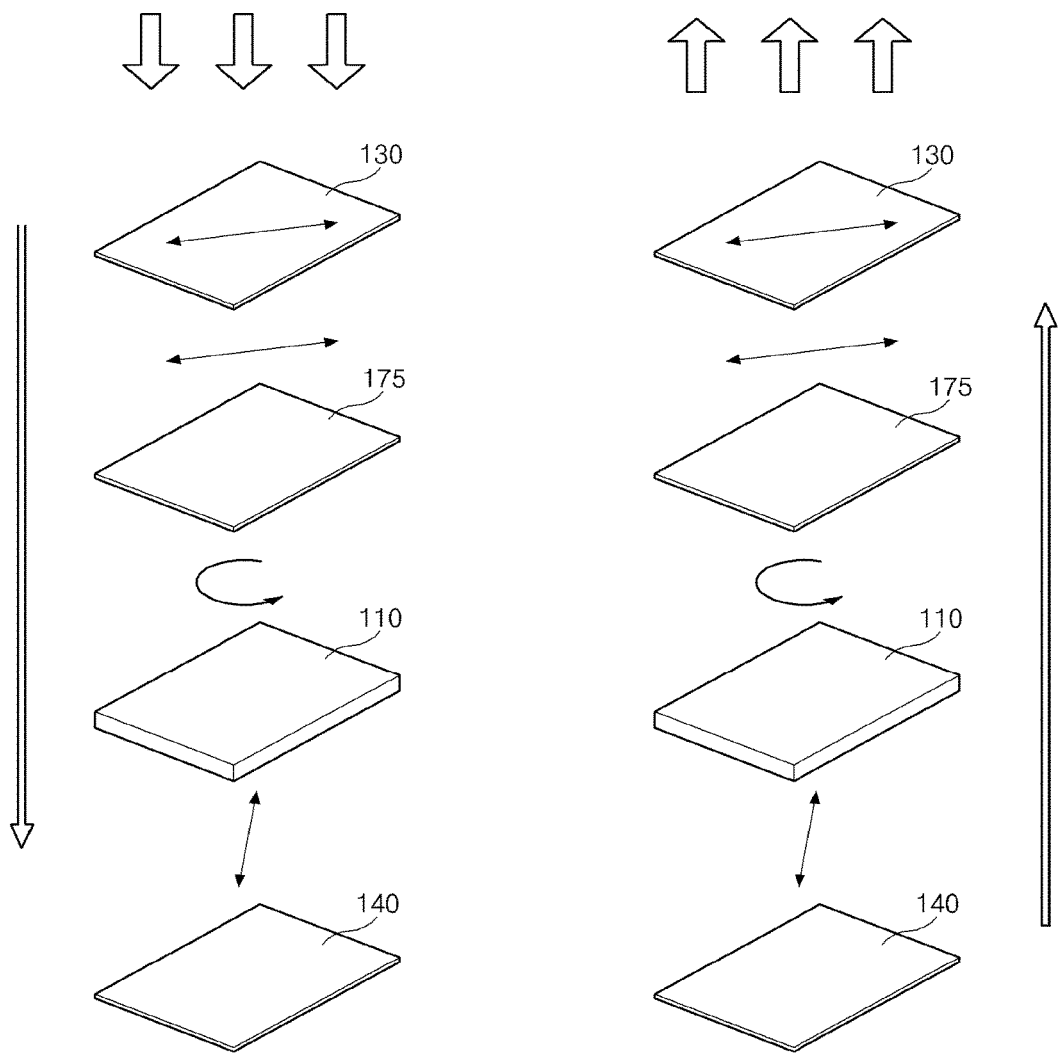

FIGS. 14A and 14B are schematic views illustrating an image display principle of the LCD according to the fifth embodiment of the present invention, and FIGS. 15A and 15B are schematic views illustrating variation of light in the states of FIGS. 14A and 14B, respectively.

Referring to FIGS. 14A to 15B, the liquid crystal panel 110 includes the pixel electrode 124 and the common electrode 136 to generate a vertical electric field. The liquid crystal molecules 220 are negative type nematic liquid crystal molecules.

In the LCD 100, the polarizing plate 130 is located close to the side upon which an external light is incident, and the phase retardation plate 175, the liquid crystal panel 110 and the reflection plate 140 are sequentially arranged below the polarizing plate 130.

The phase retardation plate 120 may be between the second substrate 114 and the nanocapsule liquid crystal layer 200. The reflection plate 140 may be between the first substrate 112 and the nanocapsule liquid crystal layer 200.

The thin film transistor T and the pixel electrode 124 are formed on an inner surface of the first substrate 112. The black matrix 132, the color filter 134 and the common electrode 136 are formed on an inner surface of the second substrate 114.

The liquid crystal molecules 220 are arranged perpendicularly to an electric field that is vertical to the first and second substrates 112 and 114, and a refractive index in a direction perpendicular to the electric field is manifested.

Referring to FIGS. 14A and 15A, when no voltage is applied to the liquid crystal panel 110, the liquid crystal molecules 220 are arranged randomly, the liquid crystal molecules 220 and the nano capsule 230 have different anisotropies in refractive index from each other. Accordingly, optically isotropic property is obtained.

Accordingly, out of an external light, the polarizing plate 130 transmits a first linearly polarized light parallel with a polarizing axis of the polarizing plate 130 and absorbs other light. The first linearly polarized is modified into a circularly polarized light (e.g., a left-hand circularly polarized light) while passing through the phase retardation plate 175.

Then, the left-hand circularly polarized light passes through the nanocapsule liquid crystal layer 200 as is, and then is reflected by the reflection plate 140 and modified into a right-hand circularly polarized light.

The right-hand circularly polarized light passes through the nanocapsule liquid crystal layer 200 as is, and then enters the phase retardation plate 175. While passing through the phase retardation plate 175, the right-hand circularly polarized light is modified into a second linearly polarized light that is perpendicular to the first linearly polarized light.

The second polarized light does not pass through the polarizing plate 130, and thus a black is displayed.

Referring to FIGS. 14B and 15B, when a voltage is applied to the pixel electrode 124 and the common electrode 136, the liquid crystal molecules 220 are arranged perpendicularly to the electric field between the pixel and common electrodes 124 and 136. Accordingly, optically anisotropic property is obtained.

Accordingly, out of an external light, the polarizing plate 130 transmits a first linearly polarized light parallel with a polarizing axis of the polarizing plate 130 and absorbs other light. The first linearly polarized is modified into a left-hand circularly polarized light while passing through the phase retardation plate 175.

Then, while passing through the nanocapsule liquid crystal layer 200, the left-hand circularly polarized light is phase-retarded and thus a second linearly polarized light perpendicular to the first linearly polarized light comes out from the nanocapsule liquid crystal layer 200.

Then, the second linearly polarized light is reflected by the reflection plate 140, and then is phase-retarded passing through the nanocapsule liquid crystal layer 200. Accordingly, a right-hand circularly polarized light comes out from the nanocapsule liquid crystal layer 200, and then is modified into the first linearly polarized light while passing through the phase retardation plate 175.

Then, the first linearly polarized light passes through the polarizing plate 130, and thus a white is displayed.

Sixth Embodiment

Figure 16A:
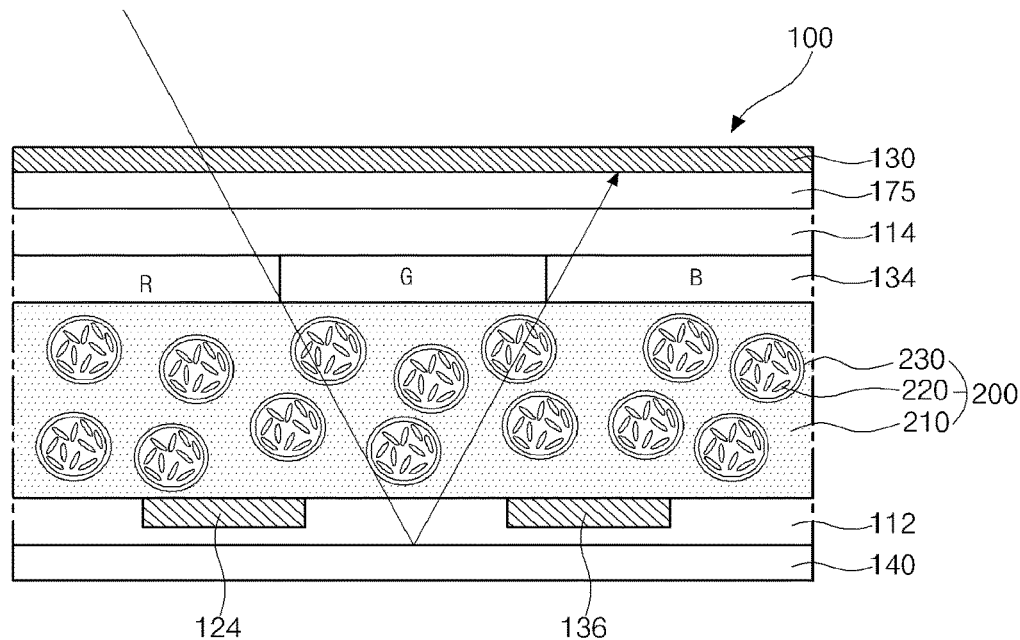
FIGS. 16A and 16B are schematic views illustrating an image display principle of an LCD according to the sixth embodiment of the present invention.
Figure 16B:
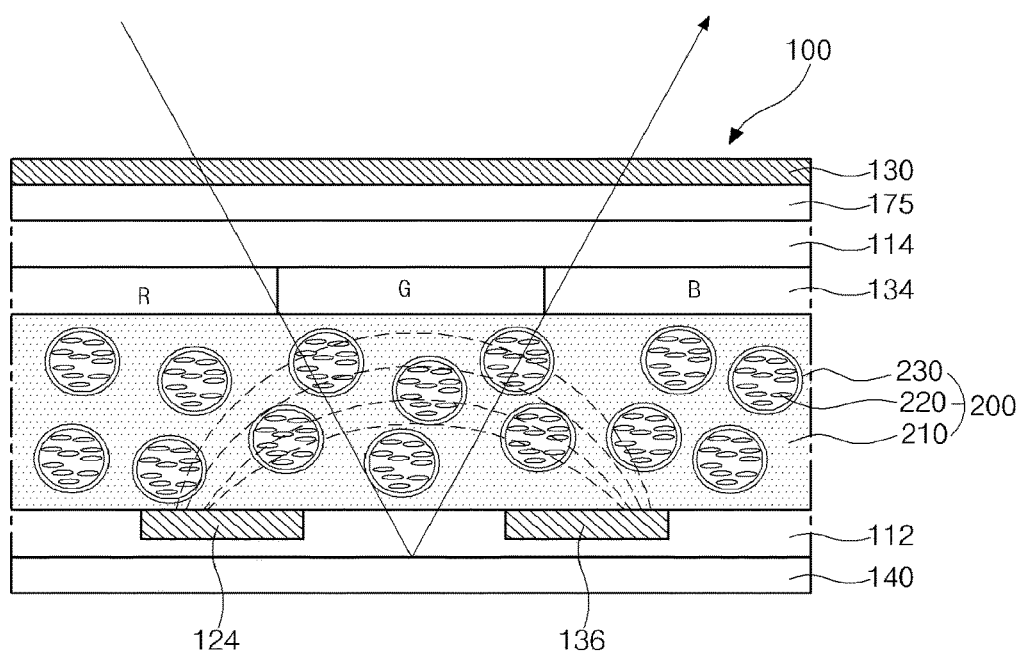

FIGS. 16A and 16B are schematic views illustrating an image display principle of the LCD according to the sixth embodiment of the present invention. Explanations of parts similar to parts of the first to fifth embodiments may be omitted.

Referring to FIGS. 16A and 16B, the liquid crystal panel 110 includes the pixel electrode 124 and the common electrode 136 to generate an in-plane electric field which is substantially parallel with the first and second substrates 112 and 114. The liquid crystal molecules 220 are positive type nematic liquid crystal molecules.

In the LCD 100, the polarizing plate 130 is located close to the side upon which an external light is incident, and the phase retardation plate 175, the liquid crystal panel 110 and the reflection plate 140 are sequentially arranged below the polarizing plate 130.

The phase retardation plate 120 may be provided between the second substrate 114 and the nanocapsule liquid crystal layer 200. The reflection plate 140 may be provided between the first substrate 112 and the nanocapsule liquid crystal layer 200.

The liquid crystal panel 110 includes the first and second substrates 112 and 114, and the nanocapsule liquid crystal layer 200 therebetween. The liquid crystal panel 110 is an IPS (in-plane switching) type panel, in which the thin film transistor T, the pixel electrode 124, and the common electrode 136 are formed on an inner surface of the first substrate 112. The black matrix 132 and the color filter 134 are formed on an inner surface of the second substrate 114. The pixel and common electrode 112 and 114 on the same substrate 112 generates an in-plane electric field parallel with the first and second substrates 112 and 114.

The liquid crystal molecules 220 are arranged parallel to the in-plane electric field that is parallel to the first and second substrates 112 and 114, and a refractive index in a direction parallel to the electric field is manifested.

Referring to FIG. 16A, when no voltage is applied to the liquid crystal panel 110, an external light is finally blocked by the polarizing plate 130, and thus a black is displayed.

Referring to FIG. 16B, when a voltage is applied to the pixel electrode 124 and the common electrode 136, the liquid crystal molecules 220 are uniformly arranged parallel to the electric field between the pixel and common electrodes 124 and 136.

Accordingly, an external light passes through the polarizing plate 130, phase retardation plate 175, and the nanocapsule liquid crystal layer 200, then is reflected by the reflection plate 140, then passes through the nanocapsule liquid crystal layer 200, the phase retardation plate 175 and the polarizing plate 130, and thus a white is displayed.

The reflective type LCD 100 according to the above fifth or sixth embodiment may be alternatively configured to have a COT (color filter on transistor) structure, where the thin film transistor T and the color filter 134 are formed together on the first substrate 112.

In this case, a black matrix is formed on a passivation layer that is on the thin film transistor T, and has a lattice shape. Red, green and blue color filters are formed on the black matrix and fill openings of the lattice of the black matrix in the respective pixel regions P. The pixel electrode 124 is formed on the color filter, and the common electrode 136 is formed on the first substrate 112 or second substrate 114 corresponding to the pixel electrode 124.

Alternatively, a COT type LCD may be configured not to have a second substrate, and in this case, the common electrode 136 of the fifth embodiment may be formed on an inner surface of the phase retardation plate 175.

In the reflective type LCD as above, by using the nanocapsule liquid crystal layer 200, where the nanocapsule 230 each filled with the randomly arranged nematic liquid crystal molecules 220 are dispersed in the buffer layer 210, between the first and second substrates 112 and 114, a response time can be fast compared to the prior art LCD.

Further, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Further, in case that the nanocapsules 230 are dispersed in the buffer layer 210 made of, for example, liquid crystal, the nanocapsule liquid crystal layer 200 may be formed, for example, by a printing method, coating method, or dispensing method. In case that the nanocapsules 230 are dispersed in the buffer layer 210 made in a film type, the nanocapsule liquid crystal layer 200 may be formed, for example, by a lamination method. Accordingly, a process of forming a gap between the first and second substrates filled with the liquid crystal layer in the prior art can be eliminated, and a process of forming the seal pattern in the prior art can be eliminated.

Therefore, production efficiency can be improved.

Further, even when an external force such as a user's touch is applied to the LCD 100 of the embodiment, the liquid crystal molecules 220 are in the nanocapsule 230 having a size less than the wavelength of visible light, thus there is substantially no influence of visible light, and thus light leakage due to the external force can be prevented.

Accordingly, in case that the LCD 100 of the embodiment is applied to a flexible display device, even when an external force is applied to the LCD 100, because of the nanocapsule 230 having a size less than the wavelength of visible light, light leakage due to the external force can be prevented.

Seventh to Eleventh embodiments of the present invention, which will now be described, relate to a flexible type LCD.

Seventh to Ninth Embodiments

Figure 17A:
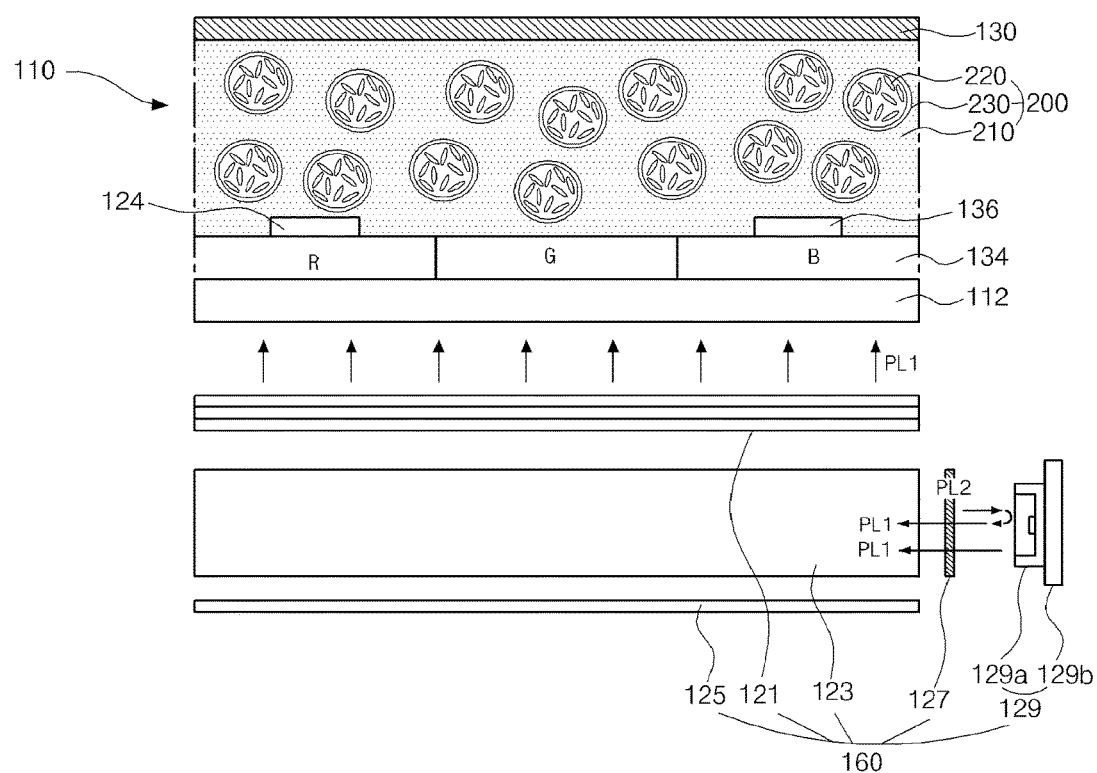
FIGS. 17A and 17B are schematic views illustrating an image display principle of an LCD according to a seventh embodiment of the present invention.
Figure 17B:
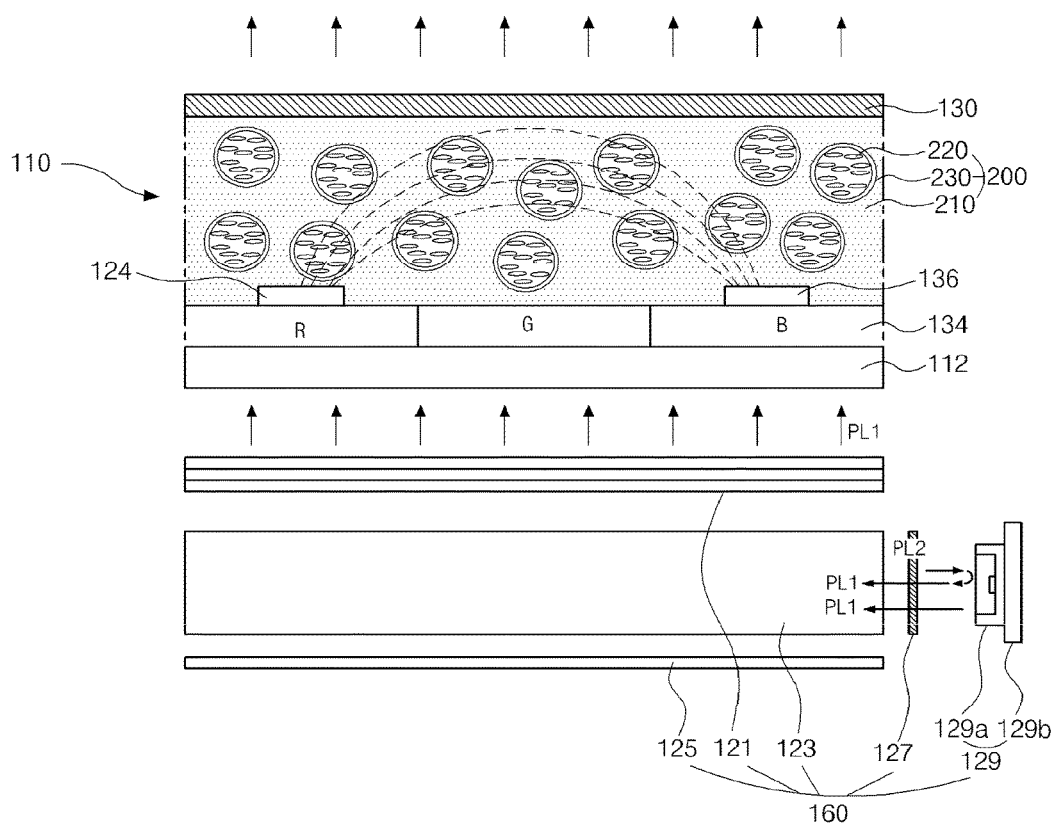
Figure 17C:
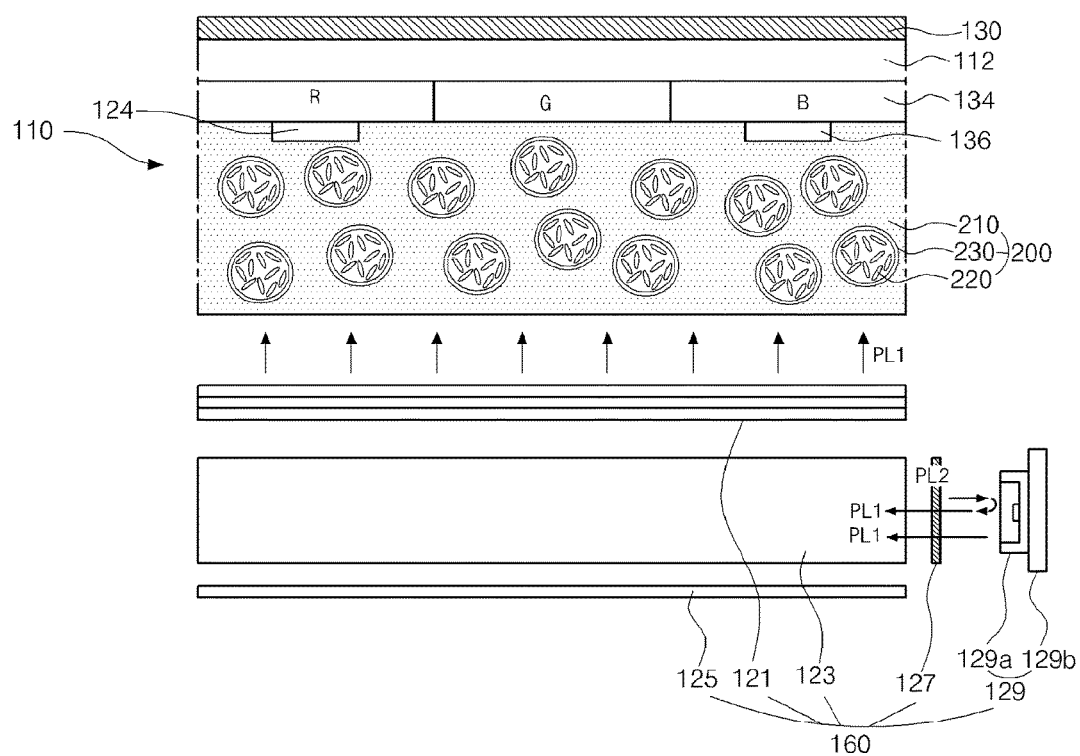
FIGS. 17C and 17D are schematic views illustrating an LCD according to eighth and ninth embodiments of the present invention, respectively.
Figure 17D:
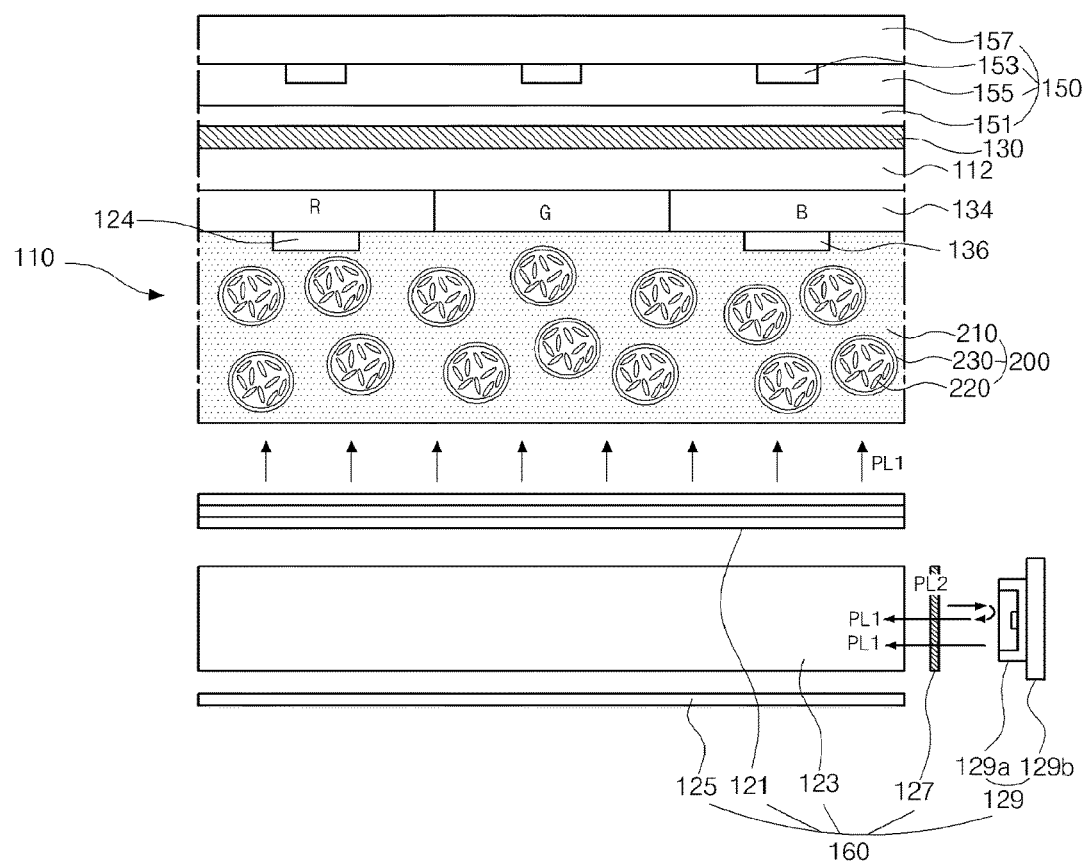

FIGS. 17A and 17B are schematic views illustrating an image display principle of an LCD according to a seventh embodiment of the present invention, and FIGS. 17C and 17D are schematic views illustrating an LCD according to eighth and ninth embodiments of the present invention, respectively. Explanations of parts similar to parts of the first to sixth embodiments may be omitted.

Referring to FIGS. 17A-17B, the flexible type LCD includes a liquid crystal panel 110 and a backlight unit 160.

The liquid crystal panel 110 includes a nanocapsule liquid crystal layer 200 on a substrate 112.

The substrate 112 is referred to as an array substrate. A plurality of gate lines and a plurality of data lines cross each other on an inner surface of the first substrate to define a plurality of pixel regions P. A thin film transistor is formed near the crossing portion of the gate and data lines. A black matrix is formed on the thin film transistor with a passivation layer therebetween, and has a lattice shape exposing the pixel regions. Red, green and blue color filters 134 fill openings of the black matrix 132 corresponding to the respective pixel regions.

A pixel electrode 124 connected to the thin film transistor and a common electrode 136 spaced apart from the pixel electrode 124 are formed on the color filters 134.

Liquid crystal molecules 220 of the nanocapsule liquid crystal layer 200 are driven by an in-plane electric field between the pixel and common electrodes 124 and 136.

A polarizing plate 130 is attached onto the nanocapsule liquid crystal layer 200.

A backlight unit 160 is below the liquid crystal panel 110 and supplies light to the liquid crystal panel 110.

The backlight unit 160 includes an LED assembly 129 along a length direction of a side of the backlight unit 160, a reflective polarizing film 127, a reflection plate 125 in white or silver color, a light guide plate 123 and at least one optical sheet 121.

The LED assembly 129 is located facing a side of the light guide plate 123 upon which the light is incident, and includes a plurality of LEDs 129a and a PCB (printed circuit board) 129b on which the plurality of LEDs 129a are mounted, with being spaced apart from each other.

The reflective polarizing film 127 is located on the front of the LEDs 129a. Out of light emitted from the LEDs 129a, the reflective polarizing film 127 transmits a predetermined polarized light, and reflects and recycles other part, and thus light efficiency of the flexible type LCD can be improved.

The reflective polarizing film 127 may be formed using a polarizer having a predetermined polarizing axis embedded in a lamination structure of dielectric thin films having different refractive indices, or using a wire grid polarizer in which fine line type metal patterns of a high reflective material, such as aluminum (Al), silver (Ag) or chromium (Cr) are arranged in parallel along a direction on a base film.

The reflective polarizing film 127 has a polarizing axis perpendicular to the polarizing axis of the polarizing plate 130.

Accordingly, all light emitted from the LED assembly 129 are supplied to the liquid crystal panel 110 substantially without loss of light.

In other words, out of the light from the LED assembly 129, a portion of the light having the same polarizing axis as the reflective polarizing film 127 is transmitted, and the other portion is reflected by the reflective polarizing film 127. A first polarized light PL1 out of the light emitted from the LED 129a is transmitted by the reflective polarizing plate 127 and enters into the light guide plate 123 via the light incidence surface of the light guide plate 123. A second polarized light PL2, which is perpendicular to the first polarized light PL1, out of the light from the LED 129a is reflected by the reflective polarizing film 127 and is recycled into a scattering light.

A first polarized light PL1 out of the recycled scattering light is transmitted by the reflective polarizing film 127, and a second polarized light PL2 out of the recycled scattering light is recycled again into a scattering light. Accordingly, light efficiency can be improved.

A specific linearly polarized light entering the light guide plate 123 travels in the light guide plate 123 and evenly spreads over a large area of the light guide plate 123, and thus a plane light is supplied to the liquid crystal panel 110.

The light guide plate 123 may include a specific-shaped pattern at a bottom surface to supply a uniform plane light.

The reflection plate 125 is located below the light guide plate 123, and reflects light coming out from the bottom surface of the light guide plate 123 to the liquid crystal panel 110, and thus brightness of light is improved.

The at least one optical sheet 121 may include a diffusion sheet, and at least one light concentration sheet. The at least one optical sheet 121 diffuses and/or concentrates light to supply more uniform plane light to the liquid crystal panel 110.

A cold cathode fluorescent lamp (CCFL), or external electrode fluorescent lamp (EEFL) may be uses as a light source instead of the LED 129a.

The liquid crystal panel 110 and the backlight unit 160 are attached to each other using a lamination process. In this process, an adhesive is interposed between the liquid crystal panel 110 and the backlight unit 120 to eliminate an air gap therebetween, and thus loss of light due to the air gap can be reduced or prevented.

The nanocapsule liquid crystal layer 200 is an optically isotropic type liquid crystal layer in a normal state. Accordingly, when no electric field between the pixel electrode 124 and the common electrode 136 is applied to the nanocapsule liquid crystal layer 200, the nanocapsule liquid crystal layer 200 is optically isotropic, and when an electric field is applied, the nanocapsule liquid crystal layer 200 has a birefringence property in a direction perpendicular to the applied electric field In other words, in case that the liquid crystal molecules 220 are negative type nematic liquid crystal molecules, the liquid crystal molecules 220 are arranged perpendicularly to an electric field to generate a birefringence property. In case that the liquid crystal molecules 220 arc positive type nematic liquid crystal molecules, the liquid crystal molecules 220 are arranged in parallel with the electric field to generate a birefringence property.

Accordingly, when an electric field is applied, the nanocapsule liquid crystal layer 200 has an optically uniaxial property In more detail, the liquid crystal molecules 220 are contained within the capsule 230 having a nanosize, and the liquid crystal molecules 220 are irregularly arranged in the nanocapsule 230.

The nanocapsule 230 may have about 5% to about 95% of a total volume of the nanocapsule liquid crystal layer 200, and preferably, may have about 25% to about 65% of the total volume of the nanocapsule liquid crystal layer 200. The buffer layer 210 occupies the rest of the total volume.

The buffer layer 210 may be made of a transparent or semi-transparent material and have water-solubility, fat-solubility, or mixture of water-solubility and fat-solubility. The buffer layer 210 may be heat cured or UV cured.

The buffer layer 210 may have an additive to increase strength and reduce curing time.

The nanocapsule 230 may have a diameter of about 1 nm to about 320 nm, and preferable, about 30 nm to about 100 nm.

Since the nanocapsule 230 has a diameter less than any wavelengths of visible light (i.e., with a diameter of about 320 nm or less), there occurs substantially no optical change due to refractive index, and optically isotropic property can be obtained. Further, scattering of visible light can be reduced or minimized.

Particularly, when the nanocapsule 230 is formed with a diameter of about 100 nm or less, high contrast ratio can be obtained.

A thickness of the nanocapsule liquid crystal layer 200 (i.e., a cell gap) is preferably about 1 um to about 10 um, and more preferably about 2 um to about 5 um.

In case that the cell gap is 2 um or less, it is difficult to externally recognize a difference in light transmittance.

In case that the cell gap is 5um or more, a distance between electrodes is great, and thus high power consumption is required. Further, an overall thickness of the liquid crystal panel 110 increases, and thus it is difficult to provide an LCD having lightweight and thin profile.

Referring to FIG. 17A, when no voltage is applied to the liquid crystal panel 110, the liquid crystal molecules 220 are arranged randomly, the liquid crystal molecules 220 and the nano capsule 230 have different anisotropies in refractive index from each other. Accordingly, optically isotropic property is obtained.

Accordingly, a linearly polarized light emitted from the backlight unit 160 passes through the nanocapsule liquid crystal layer 200 as is, and then does not pass through the polarizing plate 130 perpendicular to the polarizing axis of the linearly polarized light from the backlight unit 160. Thus, a black is displayed.

Referring to FIG. 17B, when a voltage is applied between the pixel electrode 124 and the common electrode 136, the liquid crystal molecules 220 are arranged parallel with the electric field between the pixel and common electrodes 124 and 136. Accordingly, a linearly polarized light, parallel with the liquid crystal molecules 220, out of the linearly polarized light emitted from the backlight unit 160 passes through the nanocapsule liquid crystal layer 200.

Then, a linearly polarized light, parallel with the polarizing axis of the polarizing plate 130, out of the linearly polarized light passing through the nanocapsule liquid crystal layer 200 passes through the polarizing plate 130. Thus, a white is displayed.

In this case, it is preferred that a difference between the refractive index of the nanocapsule 220 and the refractive index of the liquid crystal molecule 220 is within about ±0.1. The average refractive index (n) of the liquid crystal molecule 220 may be defined as follows: $n=[(ne+2*no)/3]$ (where ne is a refractive index of a major axis of the liquid crystal molecule 220, and no is a refractive index of a minor axis of the liquid crystal molecule 220).

Accordingly, the LCD including the nanocapsule liquid crystal layer 200 can be used as a display device, with its transmittance changing according to a variation of the voltage applied.

Further, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Further, in case that the nanocapsules 230 are dispersed in the buffer layer 210 made of, for example, liquid crystal, the nanocapsule liquid crystal layer 200 may be formed, for example, by a printing method, coating method, or dispensing method. In case that the nanocapsules 230 are dispersed in the buffer layer 210 made in a film type, the nanocapsule liquid crystal layer 200 may be formed, for example, by a lamination method. Accordingly, a process of forming a gap between the first and second substrates filled with the liquid crystal layer in the prior art can be eliminated, and a process of forming the seal pattern in the prior art can be eliminated. Therefore, production efficiency can be improved.

Further, even when an external force such as a user's touch is applied to the LCD of the embodiment, the liquid crystal molecules 220 are in the nanocapsule 230 having a size less than the wavelength of visible light, thus there is substantially no influence of visible light, and thus light leakage due to the external force can be reduced or prevented.

Accordingly, in case that the LCD of the embodiment is applied as a flexible display device, even when the external force is applied to the LCD, because of the nanocapsule 230 having a size less than the wavelength of visible light, light leakage due to the external force can be reduced or prevented.

Particularly, since the flexible type LCD of the embodiment includes the reflective polarizing film 127 on the front of the LED assembly 129, the linearly polarized light from the backlight unit 160 is supplied to the liquid crystal panel 110. Accordingly, one polarizing plate can be eliminated.

Figure 2:
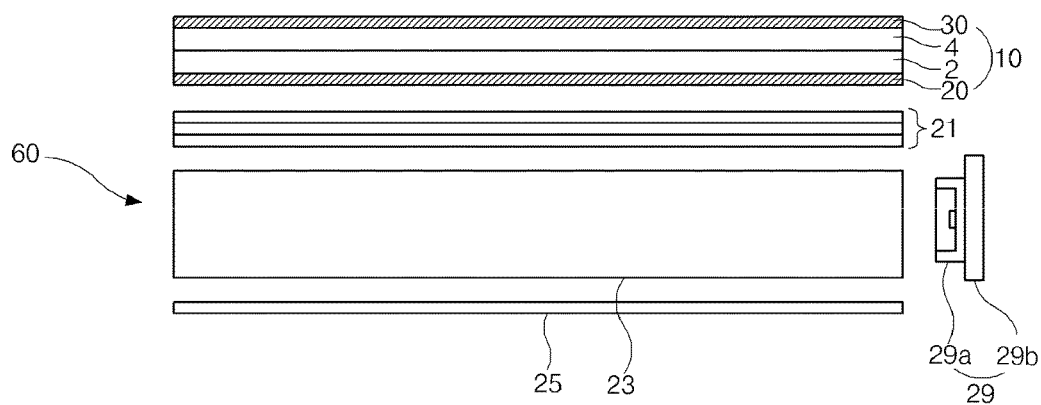
FIG. 2 is a cross-sectional view illustrating the LCD including the backlight unit according to the prior art.

Thus, the LCD of the embodiment may not require the second substrate (4 of FIG. 2) and one polarizing plate (20 of FIG. 2) in the prior art, thus a total thickness of the liquid crystal panel 110 can be reduced, and thus the LCD can have lightweight and thin profile and can be effectively applied as a flexible type display device.

Alternatively, since the nanocapsule liquid crystal layer 200 is formed with the nanocapsules 230 dispersed in the buffer layer of liquid crystal or in a film type, another flexible type LCD of an eighth embodiment may be provided as illustrated in FIG. 17C, in which the nanocapsule liquid crystal layer 200 is located facing the backlight unit 160, and in this case, the polarizing plate 130 is located on the top surface of the substrate 112.

Alternatively, another flexible type LCD of the ninth embodiment may be provided as illustrated in FIG. 17D, in which the nanocapsule liquid crystal layer 200 is located facing the backlight unit 160 similarly to the above eighth embodiment. Further, a touch panel 150 is located on the liquid crystal panel 110 with the polarizing plate 130, and includes first electrode 151, an insulating layer 155, and a second electrode 153. Thus, the flexible type LCD of this embodiment can be applied to a touch type display device.

In the above seventh to ninth embodiments, in addition to the reflective polarizing film 127, a wire-grid lattice may be formed in the light guide plate 123 so that only a specific linearly polarized light passes through the light guide plate 123 and then is supplied to the liquid crystal panel 110. Alternatively, in addition to the reflective polarizing film 127, a polarization separation layer may be formed on the light guide plate 123 so that only a specific linearly polarized light passes through the light guide plate 123 and then is supplied to the liquid crystal panel 110.

Tenth Embodiment

Figure 18:
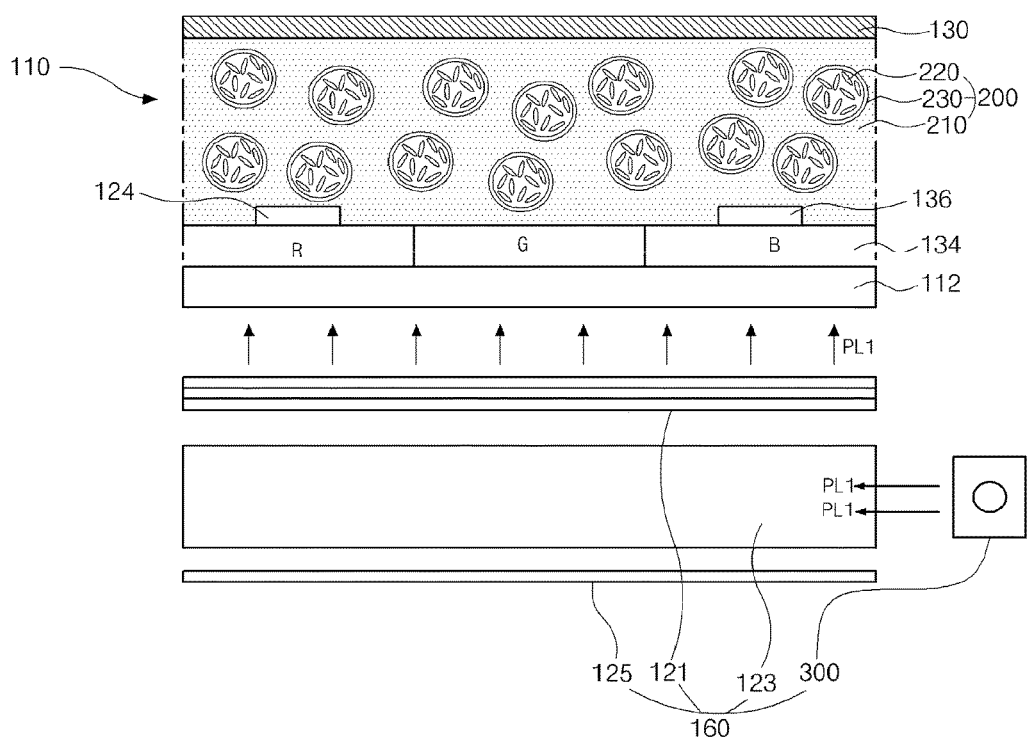
FIG. 18 is a schematic view illustrating an LCD according to a tenth embodiment of the present invention.

FIG. 18 is a schematic view illustrating a flexible type LCD according to the tenth embodiment of the present invention. Explanations of parts similar to parts of the first to ninth embodiments may be omitted.

Referring to FIG. 18, the flexible type LCD includes a liquid crystal panel 110 and a backlight unit 160. The liquid crystal panel 110 includes a nanocapsule liquid crystal layer 200 on a substrate 112, on which the thin film transistor and the color filter 134 are formed.

Further, the pixel electrode 124 and the common electrode 136 are formed on the substrate 112.

The nanocapsule liquid crystal layer 200 includes the nanocapsules 230 filled with the liquid crystal molecules 220 and dispersed in the buffer layer 210.

The polarizing plate 130 is attached onto the polarizing plate 130, and the backlight unit 160 is below the liquid crystal panel 110.

The backlight unit 160 includes non-polar or semi-polar LEDs 300 arranged along a length direction of a side of the backlight unit 160, the reflection plate 125, the light guide plate 123 on the reflection plate 125, and at least one optical sheet 121.

The non-polar or semi-polar LEDs 300 as light sources are located at and faces the surface of the light guide plate 123 upon which the light is incident.

The non-polar or semi-polar LED 300 has a property of emitting light polarized in a specific direction.

The non-polar or semi-polar LED 300 is different from a polar LED including a compound semiconductor layer grown in a c-axis direction. For example, by growing a nitride semiconductor layer of a GaN group material, such as GaN, InGaN, AlGaN, AlInGaN or the like, on a m-surface or a-surface of a GaN substrate, a non-polar or semi-polar LED without spontaneous polarization or piezoelectric polarization may be formed.

Further, an LED using a nitride semiconductor layer may be formed to emit light of wavelength in a range of UV light to visible light by adjusting a composition ratio of the nitride semiconductor.

A specific linearly polarized light entering the light guide plate 123 from the non-polar or semi-polar LED 300 travels in the light guide plate 123 and evenly spreads over a large area of the light guide plate 123, and thus a plane light is supplied to the liquid crystal panel 110.

The light guide plate 123 may include a specific-shaped pattern at a bottom surface to supply a uniform plane light.

The reflection plate 125 is located below the light guide plate 123, and reflects light coming out from the bottom surface of the light guide plate 123 to the liquid crystal panel 110, and thus brightness of light is improved.

The at least one optical sheet 121 may include a diffusion sheet, and at least one light concentration sheet. The at least one optical sheet 121 diffuses and/or concentrates light to supply more uniform plane light to the liquid crystal panel 110.

When no voltage is applied to the liquid crystal panel 110, the liquid crystal molecules 220 are arranged randomly, the liquid crystal molecules 220 and the nano capsule 230 have different anisotropies in refractive index from each other. Accordingly, optically isotropic property is obtained.

Accordingly, a linearly polarized light emitted from the backlight unit 160 passes through the nanocapsule liquid crystal layer 200 as is, and then does not pass through the polarizing plate 130 perpendicular to the polarizing axis of the linearly polarized light from the backlight unit 160. Thus, a black is displayed.

When a voltage is applied between the pixel electrode 124 and the common electrode 136, the liquid crystal molecules 220 are arranged parallel with the electric field between the pixel and common electrodes 124 and 136. Accordingly, a linearly polarized light, parallel with the liquid crystal molecules 220, out of the linearly polarized light emitted from the backlight unit 160 passes through the nanocapsule liquid crystal layer 200.

Then, a linearly polarized light, parallel with the polarizing axis of the polarizing plate 130, out of the linearly polarized light passing through the nanocapsule liquid crystal layer 200 passes through the polarizing plate 130. Thus, a white is displayed.

Eleventh Embodiment

Figure 19A:
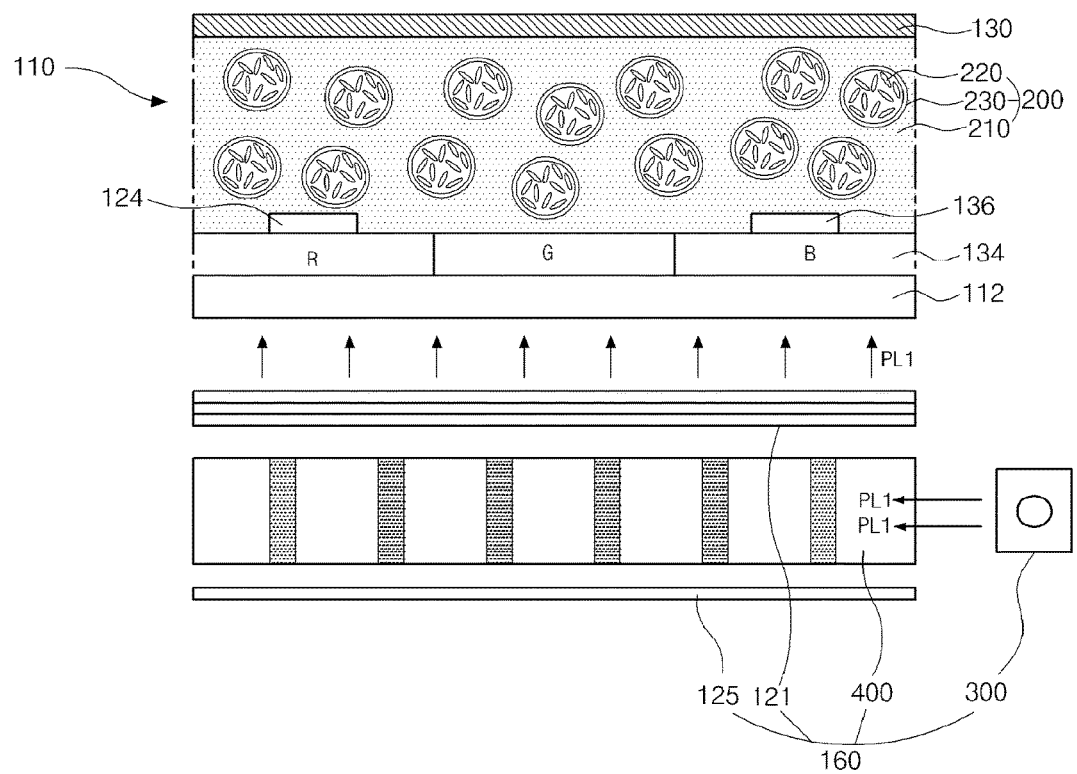
FIG. 19A is a schematic view illustrating an LCD according to an eleventh embodiment of the present invention.
Figure 19B:
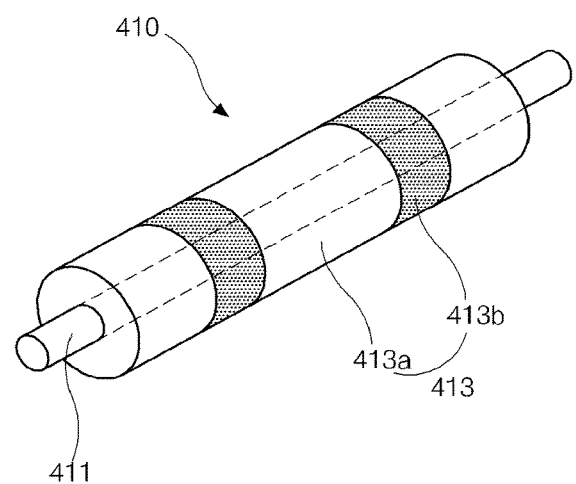
FIG. 19B is a schematic perspective view illustrating an optical fiber of an optical fiber type light guide plate of FIG. 19A.

FIG. 19A is a schematic view illustrating a flexible type LCD according to an eleventh embodiment of the present invention, and FIG. 19B is a schematic perspective view illustrating an optical fiber of an optical fiber type light guide plate of FIG. 19A. Explanations of parts similar to parts of the first to tenth embodiments may be omitted.

Referring to FIGS. 19A and 19B, the flexible type LCD includes a liquid crystal panel 110 and a backlight unit 160. The liquid crystal panel 110 includes a nanocapsule liquid crystal layer 200 on a substrate 112, on which the thin film transistor and the color filter 134 are formed.

Further, the pixel electrode 124 and the common electrode 136 are formed on the substrate 112.

The nanocapsule liquid crystal layer 200 includes the nanocapsules 230 filled with the liquid crystal molecules 220 and dispersed in the buffer layer 210.

The polarizing plate 130 is attached onto the polarizing plate 130, and the backlight unit 160 is below the liquid crystal panel 110.

The backlight unit 160 includes non-polar or semi-polar LEDs 300 arranged along a length direction of a side of the backlight unit 160, the reflection plate 125, a light guide plate 400 on the reflection plate 125, and at least one optical sheet 121. The light guide plate 123 is an optical fiber type light guide plate.

The reflection plate 125 is located below the light guide plate 400, and reflects light coming out from the bottom surface of the light guide plate 400 to the liquid crystal panel 110, and thus brightness of light is improved.

The at least one optical sheet 121 may include a diffusion sheet, and at least one light concentration sheet. The at least one optical sheet 121 diffuses and/or concentrates light from the light guide plate 400 to supply more uniform plane light to the liquid crystal panel 110.

The non-polar or semi-polar LEDs 300 as light sources are located at and faces the light incidence surface of the light guide plate 400.

The non-polar or semi-polar LED 300 has a property of emitting light polarized in a specific direction.

A specific linearly polarized light entering the light guide plate 400 from the non-polar or semi-polar LED 300 travels in the light guide plate 400 and evenly spreads over a large area of the light guide plate 400, and thus a plane light is supplied to the liquid crystal panel 110.

The light guide plate 400 is formed using a plurality of optical fibers 410 which are arranged in parallel with each other to form a plate.

As illustrated in FIG. 19B, the optical fiber 410 includes a core 411 at a center portion, and a clad 413 enclosing an outer surface of the core 411.

The clad 413 includes a light guide portion 413a, which has a refractive index (n2) less than a refractive index (n1) of the core 411 and in which a total internal reflection happens, and a light emission portion 413b which has a refractive index (n3) equal to or greater than the refractive index (n1) of the core 411 and which emits an internal light to the outside.

The refractive index (n1) of the core 411, the refractive index (n2) of the light guide portion 413a, and the refractive index of the light emission portion 413b each have a range of about 1.2 to about 1.6 greater than a refractive index of an air.

In other words, in order that a linearly polarized light from the LED 300 traveling in the core 411 with a total reflection is emitted to the outside at a certain position, the clad 413 has a refractive index at a predetermined position different from that at other position. That is, the light emission portion 413b is formed to have a refractive index different from other portion.

When a refractive index of the clad 413 is less than that of the core 411, an internal light of the core 411 travels being reflected inside the core 411. However, when a refractive index of the clad 413 at a certain position is greater than that of the core 411, a condition for the total internal reflection at the position is not met, a part of the light traveling in the core 411 externally escapes from the optical fiber 410.

In this regard, the light guide portion 413a and the light emission portion 413b are configured to contact each other from an inner side of the clad 413 to an outer side of the clad 413.

The optical fibers 410 as above are bound to each other to form the optical fiber type light guide plate 400. Accordingly, a backlight unit 160 can be configured to emit light at a predetermined position on a length direction of the optical fiber 410.

In this embodiment, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Further, in case that the nanocapsules 230 are dispersed in the buffer layer 210 made of, for example, liquid crystal, the nanocapsule liquid crystal layer 200 may be formed, for example, by a printing method, coating method, or dispensing method. In case that the nanocapsules 230 are dispersed in the buffer layer 210 made in a film type, the nanocapsule liquid crystal layer 200 may be formed, for example, by a lamination method. Accordingly, a process of forming a gap between the first and second substrates filled with the liquid crystal layer in the prior art can be eliminated, and a process of forming the seal pattern in the prior art can be eliminated.

Therefore, production efficiency can be improved.

Further, even when an external force such as a user's touch is applied to the LCD of the embodiment, the liquid crystal molecules 220 are in the nanocapsule 230 having a size less than the wavelength of visible light, thus there is no influence of visible light, and thus light leakage due to the external force can be reduced or prevented.

Accordingly, in case that the LCD of the embodiment is applied as a flexible display device, even when the external force is applied to the LCD, because of the nanocapsule 230 having a size less than the wavelength of visible light, light leakage due to the external force can be prevented.

Particularly, since the flexible type LCD of the embodiment includes the non-polar or semi-polar LED 300 emitting a predetermined linearly polarized light, the linearly polarized light from the backlight unit 160 is supplied to the liquid crystal panel 110. Accordingly, one polarizing plate can be eliminated.

Thus, the LCD of the embodiment may not require the second substrate (4 of FIG. 2) and one polarizing plate (20 of FIG. 2) in the prior art, thus a total thickness of the liquid crystal panel 110 can be reduced, and thus the LCD can have lightweight and thin profile and can be effectively applied as the flexible type display device. Further, since the optical fiber type light guide plate 400 is used for the LCD, the backlight unit 160 of thin-profile and high efficiency can be provided, and thus the flexible LCD can be applied to a bendable or rollable display device.

Alternatively, the light guide plate (123 of one of FIGS. 17B to 17D) of one of the seventh to ninth embodiments may be an optical fiber type light guide plate. Further, in the LCD of the tenth or eleventh embodiment, the nanocapsule liquid crystal layer 200 may be located to face the backlight unit 160 like FIG. 17C or FIG. 17D.

Further, the LCD of the tenth or eleventh embodiment may employ the liquid crystal panel 110 and the backlight unit 160 modulized using a lamination process. In this process, an adhesive is interposed between the liquid crystal panel 110 and the backlight unit 120 to eliminate an air gap therebetween, and thus loss of light due to the air gap can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reflective type liquid crystal display device comprising:
   a liquid crystal panel that includes a first electrode, a nanocapsule liquid crystal layer on the first electrode, and a second electrode on the nanocapsule liquid crystal layer, wherein the nanocapsule liquid crystal layer includes nano-sized capsules which are each filled with negative type liquid crystal molecules and are dispersed in a buffer layer;
   a polarizing plate that is on a surface of the liquid crystal layer through which an external light enters;
   a phase retardation plate between the polarizing plate and the liquid crystal panel; and
   a reflection plate that reflects light passing through the nanocapsule liquid crystal layer,
   wherein the nanocapsule liquid crystal layer has an optical anisotropy according to a voltage difference between voltages applied to the first and second electrodes, and has an optical isotropy when no voltages are applied to the first and second electrodes, and
   wherein the first electrode includes a vertex, a first inclined plane and a second inclined plane, such that the vertex is formed between the first inclined plane and the second inclined plane, wherein the second electrode includes a vertex, a first inclined plane and a second inclined plane, such that the vertex is formed between the first inclined plane and the second inclined plane, and wherein the first and second inclined planes of the first electrode are substantially parallel with the first and second inclined planes, respectively, of the second electrode.

2. The device of claim 1, wherein the phase retardation plate is a λ/4 wave plate that have a following relation of refractive indices: nx=ny>nz.

3. The device of claim 1, wherein a diameter of the nano-sized capsule is about 1 nm to about 320 nm.

4. The device of claim 1, wherein a volume of the nano-sized capsule is about 25% to about 65% of a volume of the nanocapsule liquid crystal layer.

5. The device of claim 1, wherein a thickness of the nanocapsule liquid crystal layer is about 2 um to about 5um.

6. The device of claim 1, wherein a refractive index different between the liquid crystal molecule and the nano-sized capsule is about ±0.1.

7. The device of claim 1, wherein the liquid crystal panel includes a first substrate on which the first electrode is formed, and wherein a thin film transistor is formed on the first substrate.

8. The device of claim 7, wherein the second electrode is formed on the phase retardation plate or the polarizing plate.

9. The device of claim 7, wherein the liquid crystal panel includes a second substrate facing the first substrate with the nanocapsule liquid crystal layer therebetween, and wherein the second electrode is formed on the second substrate.

10. The device of claim 9, wherein a color filter is formed on the first substrate or second substrate.

11. The device of claim 7, wherein the reflection plate is formed as a reflection electrode on the first substrate.

* * * * *